United States Patent
Dai et al.

(10) Patent No.: US 9,497,035 B2
(45) Date of Patent: Nov. 15, 2016

(54) METHOD, DEVICE, AND SYSTEM FOR PLAYING MEDIA BASED ON P2P

(75) Inventors: Fen Dai, Shenzhen (CN); Tieying Wang, Shenzhen (CN); Zhefeng Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 491 days.

(21) Appl. No.: 12/950,778

(22) Filed: Nov. 19, 2010

(65) Prior Publication Data
US 2011/0067074 A1    Mar. 17, 2011

Related U.S. Application Data

(63) Continuation of application No. PCT/CN2009/070375, filed on Feb. 6, 2009.

(30) Foreign Application Priority Data

May 20, 2008 (CN) .......................... 2008 1 0097892

(51) Int. Cl.
    *H04L 12/18* (2006.01)
    *H04L 29/08* (2006.01)
    (Continued)

(52) U.S. Cl.
    CPC ..... *H04L 12/1827* (2013.01); *H04L 29/08729* (2013.01); *H04L 65/4084* (2013.01);
    (Continued)

(58) Field of Classification Search
    CPC ................... H04N 21/2225; H04N 21/23106; H04N 21/2385; H04N 21/2396; H04N 21/26275; H04N 21/26616; H04N 21/4331; H04N 21/47202; H04N 21/6405; H04N 21/6587; H04N 7/17336; H04N 21/2187; H04N 21/632; H04L 12/1827; H04L 65/4084; H04L 29/08729; H04L 65/80; H04L 67/1074
    USPC ............ 709/231, 203; 710/36, 57; 715/767; 714/748; 370/252, 352, 390; 725/25, 725/86–88, 93–95, 97–98, 101
    See application file for complete search history.

(56) References Cited

U.S. PATENT DOCUMENTS 5,945,987 A * 8/1999 Dunn ............................ 715/718
2002/0041606 A1* 4/2002 Chin et al. .................... 370/468
(Continued)

FOREIGN PATENT DOCUMENTS

CN    1604569 A    4/2005
CN    1863054 A    11/2006
(Continued)

OTHER PUBLICATIONS iStreamPlanet, Delivering Live and On-Demand Smooth Streaming, Microsoft, p. 28.*
(Continued)

*Primary Examiner* — Benjamin R Bruckhart
*Assistant Examiner* — Jen-Shi Huang
(74) *Attorney, Agent, or Firm* — Brinks Gilson & Lione

(57) ABSTRACT

A P2P based method for playing media is provided. The method includes logging in a network; selecting a live broadcasting service or a video-on-demand service, and receiving a judgment result on whether to buffer a data flow corresponding to the live broadcasting service or the video-on-demand service; obtaining the corresponding data flow according to a selection result, and buffering the data flow when the judgment result is yes; and providing the buffered corresponding data flow for a video-on-demand node or a live broadcasting node as a data source of the live broadcasting service or the video-on-demand service.

18 Claims, 16 Drawing Sheets

(51) Int. Cl.

| | | |
|---|---|---|
| *H04L 29/06* | (2006.01) | |
| *H04N 21/433* | (2011.01) | |
| *H04N 21/63* | (2011.01) | |
| *H04N 21/2187* | (2011.01) | |
| *H04N 21/472* | (2011.01) | |

(52) U.S. Cl.
CPC ........... *H04L65/80* (2013.01); *H04L 67/1074* (2013.01); *H04N 21/4331* (2013.01); *H04N 21/632* (2013.01); *H04N 21/2187* (2013.01); *H04N 21/47202* (2013.01)

(56) References Cited

U.S. PATENT DOCUMENTS

| | | | |
|---|---|---|---|
| 2002/0124262 A1* | 9/2002 | Basso et al. | 725/109 |
| 2003/0037331 A1* | 2/2003 | Lee | 725/32 |
| 2003/0093548 A1* | 5/2003 | Cinghita et al. | 709/231 |
| 2003/0126277 A1* | 7/2003 | Son et al. | 709/231 |
| 2003/0229900 A1* | 12/2003 | Reisman | 725/87 |
| 2004/0031058 A1* | 2/2004 | Reisman | 725/112 |
| 2007/0064702 A1* | 3/2007 | Bates et al. | 370/392 |
| 2007/0130597 A1* | 6/2007 | Parker et al. | 725/94 |
| 2007/0183342 A1* | 8/2007 | Wong et al. | 370/252 |
| 2007/0250880 A1* | 10/2007 | Hainline | 725/97 |
| 2007/0261088 A1* | 11/2007 | Phillips et al. | 725/97 |
| 2007/0283397 A1* | 12/2007 | Scholl | 725/86 |
| 2008/0205291 A1* | 8/2008 | Li et al. | 370/254 |
| 2008/0256246 A1* | 10/2008 | Schlacht et al. | 709/228 |
| 2008/0282299 A1* | 11/2008 | Koat | H04L 12/14 725/93 |
| 2009/0106802 A1* | 4/2009 | Zuckerman et al. | 725/91 |
| 2009/0116640 A1* | 5/2009 | Noh et al. | 380/29 |
| 2009/0119734 A1* | 5/2009 | Deshpande et al. | 725/118 |
| 2009/0164656 A1 | 6/2009 | Guan | |
| 2009/0198833 A1* | 8/2009 | Kisel et al. | 709/242 |
| 2009/0259667 A1 | 10/2009 | Wang et al. | |
| 2009/0282160 A1 | 11/2009 | Wang et al. | |

FOREIGN PATENT DOCUMENTS

| | | |
|---|---|---|
| CN | 1909509 A | 2/2007 |
| CN | 1996886 A | 7/2007 |
| CN | 101005606 A | 7/2007 |
| CN | 101051980 A | 10/2007 |
| CN | 101068186 A | 11/2007 |
| CN | 101141490 A | 3/2008 |
| CN | 101179705 A | 5/2008 |

OTHER PUBLICATIONS

Office Action issued in corresponding Chinese Patent Application No. 200810097892.6, mailed May 9, 2012.
Extended European Search Report issued in corresponding European Patent Application No. 09749411.6, mailed May 25, 2011.
Written Opinion of the International Searching Authority issued in corresponding PCT Patent Application No. PCT/CN2009/070375, mailed May 14, 2009.
International Search Report issued in corresponding PCT Patent Application No. PCT/CN2009/070375, mailed May 14, 2009.
Yim et al., "Decentralized Media Streaming Infrastructure (DeMSI): An Adaptive and High-Performance Peer-to-Peer Content Delivery Network", Journal of Systems Architecture, vol. 52 pp. 737-772, 2006.
Jernberg et al., "DOH: A Content Delivery Peer-to-Peer Network", Journal of Systems Architecture, vol. 52 No. 12, Dec. 1, 2006.
Liu et al., "Opportunities and Challenges of Peer-to-Peer Internet Video Broadcast", Proceeding of the IEEE, vol. 96 No. 1, Jan. 2008.
Gale Huang, "PPLive—A Practical P2P Live System with Huge Amount of Users" Shanghai Synacast Media-Tech Corp., Sep. 2007. Power Point.
Gale Huang, "PPLive—A Practical P2P Live System with Huge Amount of Users" Shanghai Synacast Media-Tech Corp., Sep. 2007. PDF.
Hai et al., "Principles and Applications of P2P Technology", ZTE Communications, vol. 13 No. 6, Dec. 2007.
Office Action issued in corresponding European Patent Application No. 09749411.6, mailed Jan. 16, 2013.
Chinese Patent No. 101588468, issued on Aug. 7, 2013, granted in corresponding Chinese Patent Application No. 200810097892.6, 34 pages.

\* cited by examiner

METHOD, DEVICE, AND SYSTEM FOR PLAYING MEDIA BASED ON P2P

CROSS-REFERENCE TO RELATED APPLICATIONS

This application is a continuation of International Application No. PCT/CN2009/070375, filed on Feb. 6, 2009, which claims priority to Chinese Patent Application No. 200810097892.6, filed on May 20, 2008, both of which are hereby incorporated by reference in their entireties.

FIELD OF THE TECHNOLOGY

The present invention relates to the field of multimedia transmission, and more particularly to a method, device and system for playing media based on P2P (peer-to-peer).

BACKGROUND OF THE INVENTION

Along with the popularization of the Internet technology, in the late 90s, P2P application represented by Napster begins to be popularized in the Internet. P2P refers to peer-to-peer computing or a peer-to-peer networking, in which nodes share sources and services through direct exchanging, and each node may be a server or a client.

Generally, a P2P based video service includes two types, namely, a live broadcasting service and a video-on-demand service.

The video live broadcasting refers to that the server plays programs at fixed time, and the user views the programs at the terminal, which is like the play mode of televisions. The topology architecture has the following features. The topology is constructed by using the server as a center, and each live broadcasting edge server is responsible for managing a part of the programs, interacting with a Peer (node), providing a program data buffer, and inserting the newly added node to a certain position of the topology.

The video video-on-demand refers to a service capable of providing an interactive video service at any time when the user requires. The topology architecture has the following features. The video-on-demand topology architecture is constructed by using the server as a center, and may be particularly in a net manner or a tree manner, super nodes (SNs) construct the backbone network, and each SN is responsible for managing a certain region, and interacting with the Peer, so as to provide a connectable node list.

During a procedure of implementing the present invention, the inventors find that the prior art at least has the following disadvantages. The functions of the live broadcasting and the video-on-demand in the P2P based video service system are independently realized, and the two play manners are not interfused, such that the two manners respectively have some problems. The living broadcasting program is smooth and clear, but cannot be dragged; and the video-on-demand program satisfies the desire of the user of playing the program at any moment, but the user needs to query the relevant program, such that a drag delay is large with a long buffer time, and a program smoothness needs to be improved. Further, each terminal node has one disk configured to buffer the data already viewed by the user, but the buffered data is not fully utilized.

SUMMARY OF THE INVENTION

Accordingly, the present invention is directed to a P2P based method for playing media, capable of interfusing a live broadcasting service and a video-on-demand video service and realizing a free switch between the two play modes.

In an embodiment, the present invention provides a P2P based method for playing media, which includes the following steps.

Log in a network.

Select a live broadcasting service or a video-on-demand service, and receive a judgment result on whether to buffer a data flow corresponding to the live broadcasting service or the video-on-demand service.

Obtain the corresponding data flow according to a selection result, and buffer the data flow when the judgment result is yes.

Provide the buffered corresponding data flow for a video-on-demand node or a live broadcasting node as a data source of the live broadcasting service or the video-on-demand service.

In another embodiment, the present invention also provides a node, which includes a log-in module, a mode selection module, an information obtaining module, and a storage module.

The log-in module is configured to log in a network.

The mode selection module is configured to select a live broadcasting service or a video-on-demand service.

The information obtaining module is configured to receive network information required by the live broadcasting service or the video-on-demand service selected by the mode selection module and a judgment result on whether to buffer a data flow corresponding to the live broadcasting service or the video-on-demand service.

The storage module is configured to obtain the data flow according to a selection result of the mode selection module, and buffer the data flow when the judgment result obtained by the information obtaining module is yes.

In another embodiment, the present invention further provides a user request routing system (RRS), which includes a user management module, a topology management module, and a server management module.

The user management module is configured to manage information of a node.

The topology management module is configured to manage topology structure information of live broadcasting and video-on-demand in the system.

The server management module is configured to manage information of each edge server (ES).

In another embodiment, the present invention further provides a core server (CS), which includes an information index module, a content blocking module, and a content distribution module.

The information index module is configured to extract metadata from a content source, and generate index information.

The content blocking module is configured to block the content source, and determine an encoding format.

The content distribution module is configured to distribute the index information generated by the information index module and content blocked by the content blocking module to corresponding ESs.

In another embodiment, the present invention further provides a live broadcasting service edge server (Live_ES), which includes a content management module, a content communication module, and a content block management module.

The content management module is configured to manage locally saved data.

The content communication module is configured to obtain locally required content, and process a received request.

The content block management module is configured to perform a block encoding on the obtained content.

In another embodiment, the present invention further provides a video-on-demand service edge server (VOD_ES), which includes a content management module, a content communication module, an SN management module, and a cluster management module.

The content management module is configured to manage locally saved data.

The content communication module is configured to obtain locally required content, and process a received request.

The SN management module is configured to manage, according to the data managed by the content management module, an SN corresponding to the data.

The cluster management module is configured to perform an SN selection and an SN deregistration on accessed nodes.

In another embodiment, the present invention further provides an SN, which includes a node state recording module and a judging module.

The node state recording module is configured to record state information of each node in a domain.

The judging module is configured to judge whether the number of buffer nodes of content blocks of a data flow corresponding to a live broadcasting service or a video-on-demand service is smaller than a set content block level threshold, according to the state information of each node in the domain recorded by the node state recording module.

In another embodiment, the present invention further provides a P2P based system for playing media, which includes a CS, at least one Live_ES, VOD_ES, RRS, SN, and node.

The CS is configured to perform a uniform encoding process on a content source, and send the processed content source to the corresponding Live_ES or VOD_ES.

The Live_ES is configured to provide a data flow required by a live broadcasting service.

The VOD_ES is configured to provide a data flow required by a video-on-demand service.

The RRS is configured to manage the Live_ES, the VOD_ES, and the node in a network.

The SN is configured to manage each node and content in a domain.

The node is configured to obtain, transmit, and store the data flow corresponding to the live broadcasting service or the video-on-demand service.

The technical solutions of some embodiments of the present invention have the following advantages. By fully utilizing characteristics of the live broadcasting service and the video-on-demand video service, the live broadcasting and video-on-demand video service can be interfused to realize a free switch from the live broadcasting to the video-on-demand. Meanwhile, a disk buffer method is improved, such that program sources may be uniformly distributed and connectable nodes are increased, and the data buffered in user node disks is applied to the video-on-demand. In addition, according to a source distribution condition, the system judges whether to buffer the currently viewed program, such that sufficient contents are ensured to be used for network applications, thus avoiding waste caused by the over much content stored repeatedly, increasing the utilization ratio of network resources, and improving the use experience of users.

DETAILED DESCRIPTION OF THE EMBODIMENTS

In an embodiment, the present invention provides a P2P based method for playing media. On a basis of realizing functions of a live broadcasting and a video-on-demand, the live broadcasting and the video-on-demand are organically combined, so as to realize a free switch from the live broadcasting to the video-on-demand. Meanwhile, a disk-buffer method is modified, such that program sources may be uniformly distributed and connectable nodes are increased, data buffered in user node disks is applied to the video-on-demand, and nodes in a video service system are in a state that the video-on-demand and the live broadcasting coexist. In addition, according to a source distribution condition, a system judges whether to buffer a currently viewed program, such that sufficient contents are ensured to be used for network applications, thus avoiding waste caused by the over much content stored repeatedly, increasing the utilization ratio of network resources, and improving the use experience of users.

Figure 1:
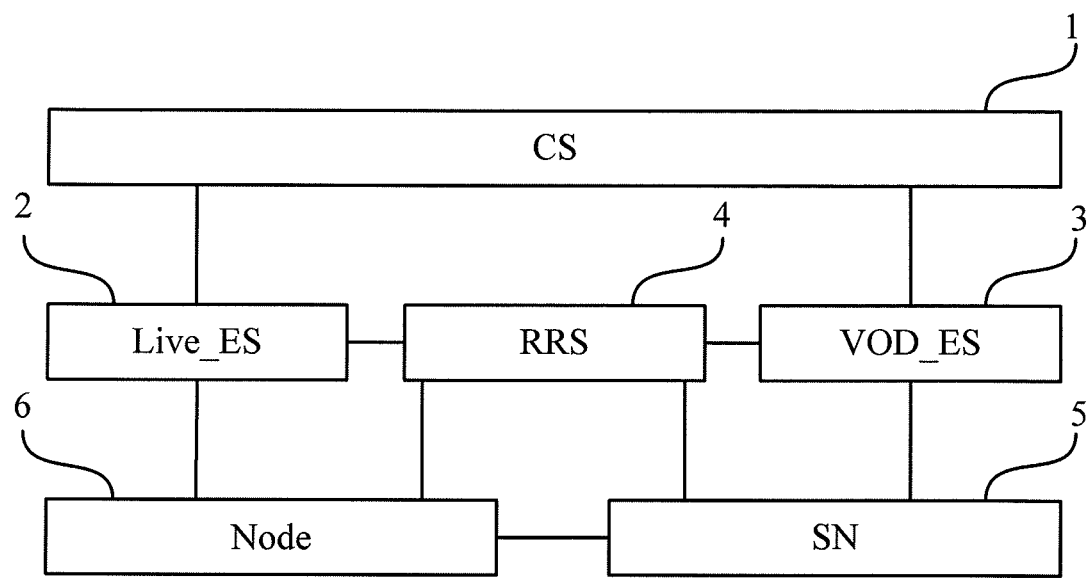
FIG. 1 is a schematic structural view of a P2P based system for playing media according to an embodiment of the present invention.

FIG. 1 is a schematic structural view of a P2P based system for playing media according to an embodiment of the present invention. Referring to FIG. 1, the system includes at least one CS 1, Live_ES 2, VOD_ES 3, RRS 4, SN 5, and node 6.

The CS 1 is the core server. When each program content is added to the system as a data source, the program content needs to be firstly processed by the CS, so as to ensure that the program contents have the same encoding mode no matter in the live broadcasting or the video-on-demand. That is to say, the program contents having the same Content ID have the same block encoding manner, and blocks corresponding to the contents in a live broadcasting system and a video-on-demand system are consistent. The program contents having the same block encoding manner and after being processed by the CS are transmitted to the Live_ES 2 and the VOD_ES 3, so as to provide a program source for a live broadcasting service and a video-on-demand service. The transmission manner includes transmitting the program contents according to requests of the ESs (including the Live_ES 2 and the VOD_ES 3), or the CS 1 actively pushes the program contents, that is to say, the CS 1 transmits the blocked contents to the Live_ES 2 and the VOD_ES 3.

The RRS 4 is configured to manage programs of the entire system, register and manage the contents on the Live_ES 2 and the VOD_ES 3, provide a reference for source optimization in the system. The CS 1 may actively report the program contents to the RRS 4, or the RRS 4 may perform content detection and detect the program contents sent by the CS 1 to the Live_ES 2 and the VOD_ES 3. Further, through the content detection the RRS 4 finds changes of the contents of the Live_ES 2 and the VOD_ES 3, so as to update the corresponding content record on the RRS 4. In addition, the RRS 4 may further register and manage a topology structure in the system.

As a manager of a domain of the VOD_ES 3, the SN 5 is configured to register and manage content blocks in different nodes in the domain, and to further register through the VOD_ES the content blocks buffered in the node performing the live broadcasting service in a live broadcasting network. By registering and managing the content blocks, the SN 5 provides the nodes for the node 6 to select an optimum video-on-demand content after the node 6 accesses the system, and provides a video-on-demand service source for the node 6.

The node 6 logs in a network through the RRS 4, and gets to know which ES the content required by the node 6 is located through the RRS 4, so as to perform the corresponding live broadcasting service or the corresponding video-on-demand service.

Figure 2:
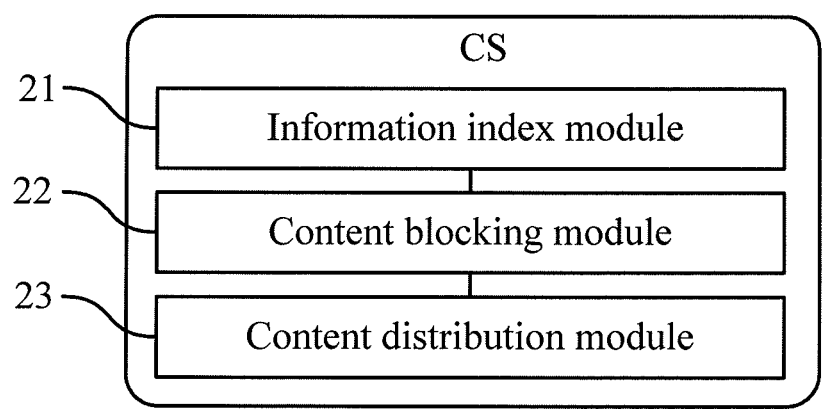
FIG. 2 is a schematic structural view of a CS according to an embodiment of the present invention.

FIG. 2 is a schematic structural view of the CS 1. Referring to FIG. 2, the CS 1 includes an information index module 21, a content blocking module 22, and a content distribution module 23.

The information index module 21 is configured to extract metadata from a content source, and generate index information. The index information is metadata information of a program, including key frames of the program and other information.

The content blocking module 22 is configured to block the content source by adopting a certain encoding format.

The content distribution module 23 is configured to distribute the index information generated by the information index module 21 and the contents blocked by the content blocking module 22 to the corresponding ESs.

The index information is sent to the ESs together with the processed contents. Before performing the media play service, the node firstly obtains the metadata information of the program from the ES, and then obtains corresponding data blocks according to the metadata.

In addition, the CS 1 saves a corresponding relation between the blocked content and the ES, and information records of pushing the contents processed by the CS 1 to the ESs, and a data structure may adopt a manner of Table 1. Please refer to Table 1.

TABLE 1

| List of Data Structure in CS | | | | |
|---|---|---|---|---|
| Content ID | ES_1 | ES_2 | ... | ES_N |

Particularly, Table 1 represents that ES_1, ES_2 ... ES_N all have the program contents corresponding to the Content ID, and definitely, it may be further pointed out that the ESs provide the live broadcasting service or the video-on-demand service.

The corresponding relation between the ES and the content as shown in the data structure may ensure that the CS 1 does not perform a repeated or conflicting process on the same content, so as to ensure the efficiency of processing the content. Meanwhile, if the CS 1 actively reports the program contents to the RRS 4, the data structure may be part of the reported content, so as to provide a content management reference for the RRS 4.

The Live_ES 2 is configured to provide a data flow required by the live broadcasting service, and saves the blocked program content obtained from the CS 1. The Live_ES 2 becomes a provider of the block data in the system, and provides for the node information of the relevant node storing the content requested by the node. Definitely, in order to ensure the quality of service (QoS) of the user, if the node cannot obtain the required data from the nodes connected thereto, the node may also obtain the required data flow from the Live_ES 2.

Figure 3:
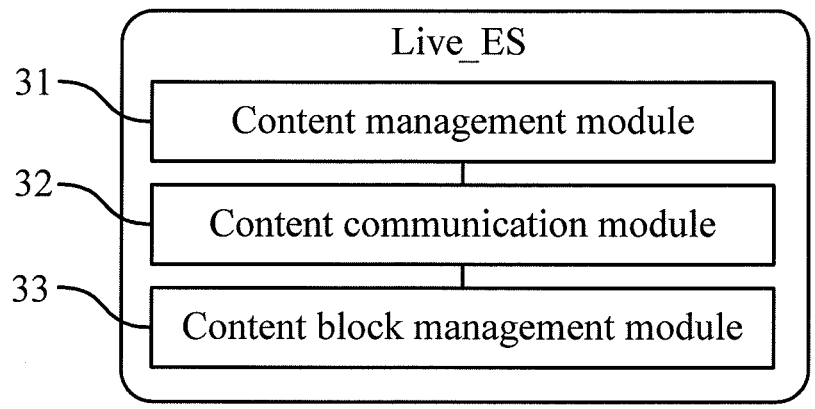
FIG. 3 is a schematic structural view of a Live_ES according to an embodiment of the present invention.

Referring to FIG. 3, the Live_ES 2 includes a content management module 31, a content communication module 32, and a content block management module 33.

The content management module 31 is configured to manage locally saved data, that is, manage the contents being blocked again.

The content communication module 32 is configured to obtain locally required contents from the CS 1, and process obtaining requests sent by other nodes.

The content block management module 33 is configured to perform a block encoding process again on the content blocks generated by the CS 1.

During the content distribution procedure, the encoding process needs to be performed on the contents, so as to form N+R blocks. That is to say, when the blocks distributed from the CS to the ESs need to be distributed to other nodes, that is, other clients, the Live_ES needs to perform the block encoding process again on the blocks, so as to form N original small blocks and R encoded blocks. N blocks are randomly selected from the N+R encoded blocks, and the clients may restore the N blocks to the original content blocks.

The VOD_ES 3 is configured to provide the data flow required by the video-on-demand service.

The VOD_ES 3 saves the blocked program contents from the CS 1, becomes a provider of the block data in the system, and provides for the node the information of the relevant node storing the content requested by the node. Definitely, in order to ensure the QoS of the user, if the node cannot obtain the required data from the nodes connected thereto, the node may also obtain the required data flow from the VOD_ES 3. The VOD_ES 3 may further manage and assign the contents as the SN 5, and definitely, the SN 5 for managing and assigning the contents may be separately set, but the SN 5 needs to be determined by the VOD_ES 3 and accepts the management of the VOD_ES 3. When the RRS 4 assigns the contents in the CS 1 to the VOD_ES 3, the SN 5 is also selected and managed by the VOD_ES 3.

Figure 4:
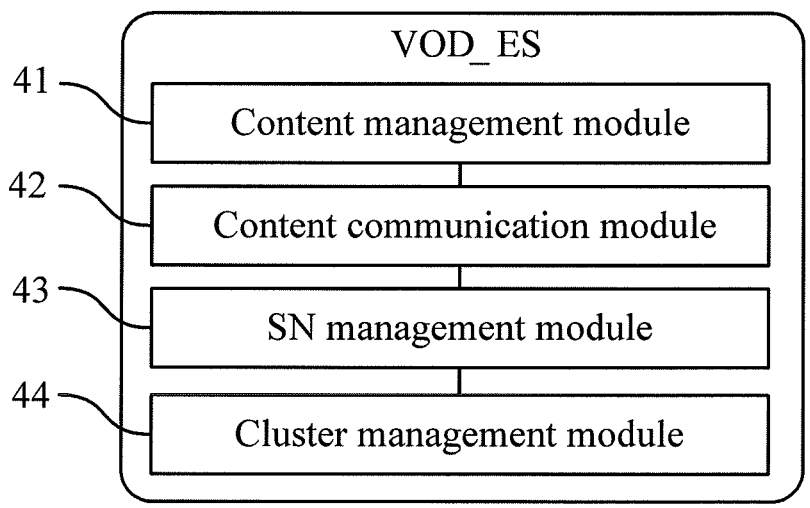
FIG. 4 is a schematic structural view of a VOD_ES according to an embodiment of the present invention.

Referring to FIG. 4, the VOD_ES 3 includes a content management module 41, a content communication module 42, a SN management module 43, and a cluster management module 44.

The content management module 41 is configured to manage the locally saved data, that is, the content blocks, in which the data may belong to different SNs, or belong to the same SN.

The content communication module 42 is configured to obtain the locally required content, and process obtaining requests sent by other nodes.

Figure 5:
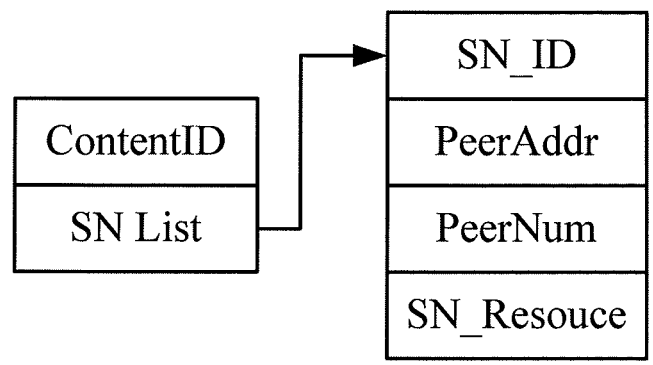
FIG. 5 is a schematic structural view of data stored in the VOD_ES according to an embodiment of the present invention.

The SN management module 43 is configured to manage SN nodes of different domains, and provide an interface for a user to query the SNs. A data structure is as shown in FIG. 5.

Content ID represents an ID of a certain program content.

SN List represents a list of SNs managing the content in the VOD_ES.

SN_ID represents an ID of a certain SN in the SN List.

PeerAddr represents an address of the SN corresponding to the SN_ID.

PeerNum represents the number of the nodes with registered contents currently owned by the SN.

SN_Resource represents a current performance using state of the SN.

The cluster management module 44 is configured to perform an SN selection on the accessed nodes. Particularly, the cluster management module 44 mainly performs the SN selection and the SN division on the logged-in nodes in the entire VOD_ES, and selects or deregisters the SN from the nodes controlled by the VOD_ES 3.

The RRS 4 is configured to manage the Live_ES 2, the VOD_ES 3, and the node 6 in the network.

No matter the user selects the video-on-demand or the live broadcasting, the nodes corresponding to the user need to register at the RRS 4. The RRS 4 manages two systems, namely, the video-on-demand system and the live broadcasting system. When each newly added live broadcasting node registers at the RRS 4, the RRS 4 returns a position of the node in a live broadcasting topology to the node, returns nodes neighboring the position to the node, and assigns a Live_ES 2 to the node, so as to ensure the QoS of user experience. Each newly added video-on-demand node may obtain the VOD_ES 3 from the RRS 4. Meanwhile, the RRS 4 manages all the nodes having the video-on-demand on the same program, and scheduling according to play time points, such that the newly added node may further obtain a set of the nodes neighboring the play point.

When the node 6 logs in the RRS 4, no matter the node 6 is added to the live broadcasting system or the video-on-demand system, it is required for the RRS 4 to return the program content to the VOD_ES 3, and the node 6 obtains the SN 5 of the program content through the VOD_ES 3, and then performs the registration, such that content file blocks subsequently downloaded and stored by the node 6 may be used by the video-on-demand node.

Figure 6:
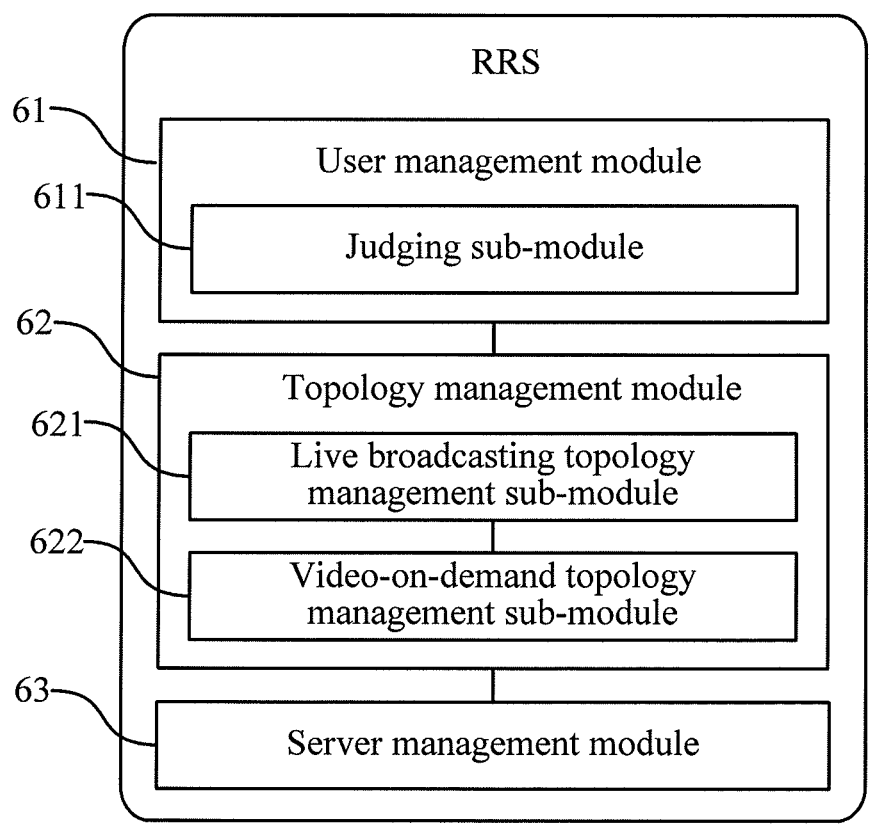
FIG. 6 is a schematic structural view of an RRS according to an embodiment of the present invention.

Referring to FIG. 6, the RRS 4 includes a user management module 61, a topology management module 62, and a server management module 63.

The user management module 61 is configured to manage information of each node in the network, and assign a Peer ID to each logged-in node. Particularly, the user management module 61 includes a judging sub-module 611.

The judging sub-module 611 is configured to judge whether the number of buffer nodes of the content of the data flow corresponding to the live broadcasting service or the video-on-demand service is smaller than a set file level threshold.

The topology management module 62 is configured to manage topology structure information of the live broadcasting and the video-on-demand in the system. The topology management module 62 includes a live broadcasting topology management sub-module 621 and a video-on-demand topology management sub-module 622.

The live broadcasting topology management sub-module 621 is configured to manage the topology structure information corresponding to the live broadcasting service.

The video-on-demand topology management sub-module 622 is configured to manage the topology structure information corresponding to the video-on-demand service.

A data structure managed by the topology management module on the RRS 4 may adopt a format as shown in Table 2. Please refer to Table 2.

TABLE 2

| List of Data Structure in RRS | | | | | | | |
|---|---|---|---|---|---|---|---|
| ContentID | MetaData | Live_ES List | VoD_ES List | Live Broadcasting Topology Structure | Video-on-demand Node List | VoD PeerNum | Live PeerNum |

ContentID represents an ID of a certain program content.

MetaData represents metadata of the content, including a content time length, a code rate, and other information representing the content.

Live_ES List represents a live broadcasting ES list of the program content.

VOD_ES List represents a video-on-demand ES list of the program content.

The live broadcasting topology structure records the live broadcasting nodes viewing the program, and a connection relation among the nodes.

The video-on-demand node list records the video-on-demand nodes viewing the program, and scheduling the nodes according to play time points.

Live PeerNum and VOD PeerNum respectively represent the number of the nodes currently viewing the live broadcasting and the number of the nodes currently viewing the video-on-demand, and through the numbers, the RRS may return to a newly added node a message on whether to store the received data.

The live broadcasting topology management sub-module manages positions of all nodes added to the live broadcasting system in a live broadcasting topology diagram, and when a new node is added to the live broadcasting system, the live broadcasting topology management sub-module returns information of corresponding neighboring nodes to the node. The video-on-demand topology management sub-module is mainly configured to record the information of each node added to the video-on-demand system, and when a new node is added to the video-on-demand system, the node returns nodes neighboring the play time point to the new node.

The server management module 63 is configured to manage the information of each ES.

Particularly, the server management module 63 manages the information of each ES in the system, so as to balance the load among the edge servers in the system. When a node is added, the server management module 63 may select and transmit some ESs having better performances to the node.

Figure 7:
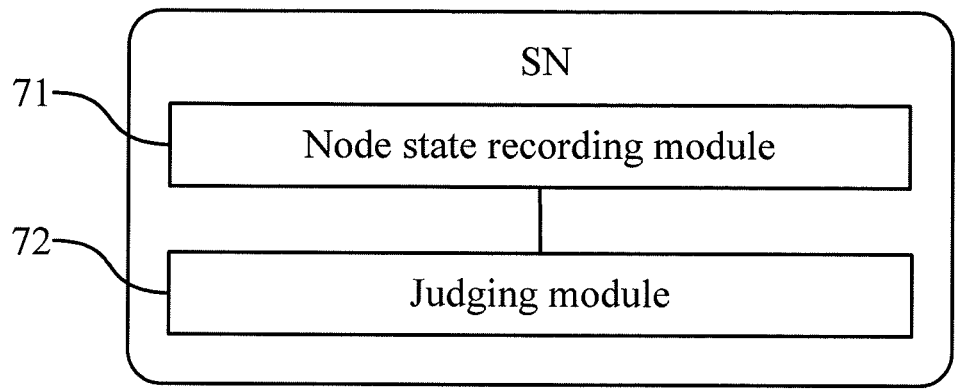
FIG. 7 is a schematic structural view of an SN according to an embodiment of the present invention.

Referring to FIG. 7, the SN 5 includes a node state recording module 71 and a judging module 72.

The node state recording module 71 is configured to record the state information of each node in one domain.

The judging module 72 is configured to judge whether the number of buffer nodes of content blocks of the data flow corresponding to the live broadcasting service or the video-on-demand service is smaller than a set content block level threshold, according to the state information of each node in the domain recorded by the node state recording module 71.

The SN exists in the video-on-demand system, and is a node having an excellent performance selected by the VOD_ES from many common nodes. The SN saves a data structure, counts the node distribution condition of each block of each content in the management region, takes statistics on the information of the node capable of providing the required data for other nodes in the domain, and judges whether to buffer the content blocks requested by the node. A schematic view of a data structure RegInfo of SN 5 is shown in FIG. 3, in which a PeerList field and a BlockInfo field are particularly as shown in Table 4 and Table 5.

TABLE 3

Schematic Structural List of Data Structure RegInfo

ContentID
PeerList
BlockInfo

TABLE 4

Schematic Structural List of PeerList

| PeerID | PeerAddr | BlockBitmap | PeerState |
| --- | --- | --- | --- |

TABLE 5

Schematic Structural List of BlockInfo

| BlockID | BlockNum |
| --- | --- |

ContentID represents an ID of a certain program content.

PeerList represents a node list of the program content managed by the SN and the content block information of the nodes.

BlockInfo represents the program content block information and the number of corresponding blocks.

PeerID represents an ID corresponding to each node.

PeerAddr represents address information corresponding to each node.

BlockBitmap represents content block information of the node.

PeerState represents a state of the node, including a video-on-demand state, a live broadcasting state, and an idle state (that is, neither video-on-demand nor live broadcasting). When the state of the node is changed, all SN nodes locally buffering the content are notified of changing the corresponding PeerState.

BlockID represents an ID of a certain block of the program content.

BlockNum represents the number of the blocks corresponding to the BlockID in the SN management domain.

Each content block registers at the SN 5 for one time, when a bit corresponding to BlockBitmap corresponding to PeerID is modified, BlockNum corresponding to the BlockID of the registered block needs to be modified, and if registration is required, it is marked by BlockNum++; otherwise, if a disk writing operation of the node fails, a rollback is performed, the bit is modified, and it is marked by BlockNum−−.

In addition, a disk volume of a certain user terminal is limited, so data replacement is required. When a newly downloaded content block replaces the original data block, the node sends the information to notify the SN 5 of keeping updating, such that the statistical data and the content distribution condition owned by the SN 5 are relatively accurate, a connectable node set obtained by the node is more reliable, thus ensuring a hit rate during the connection.

The SN 5 records the current state of the node. When the state of the node is changed, for example, the node switches from the live broadcasting to the video-on-demand, or switches from the idle state to the video-on-demand mode to view the program, the SN at which the node is registered needs to be notified of the change of the state, so the data of the SN is kept being updated.

When receiving the request of the node, the SN 5 selects at least one connectable node from all the nodes in the domain according to a priority selecting rule, so as to form the connectable node set, and sends information of the connectable node set to the corresponding requesting node. The priority selecting rule includes, but not limited to, a selecting rule according to a priority sequence of the idle node, the video-on-demand node, and the live broadcasting node.

Figure 8:
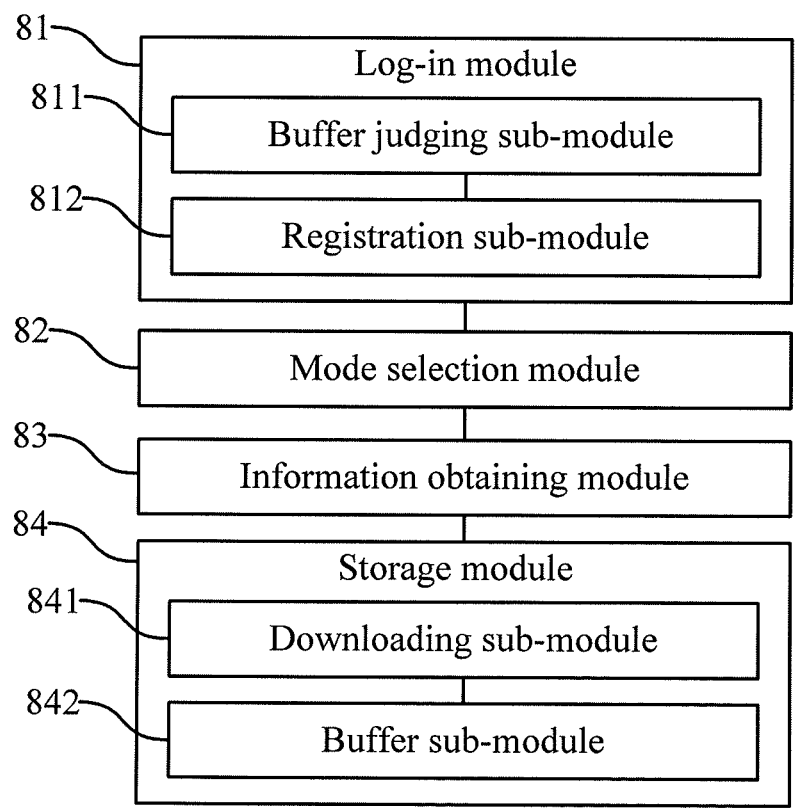
FIG. 8 is a schematic structural view of a terminal node according to an embodiment of the present invention.

The node 6 is configured to receive the data flow corresponding to the live broadcasting service or the video-on-demand service. Referring to FIG. 8, the node 6 includes a log-in module 81, a mode selection module 82, an information obtaining module 83, and a storage module 84.

The log-in module 81 is configured to log in the network, and further includes a buffer judging sub-module 811 and a registration sub-module 812.

The buffer judging sub-module 811 is configured to judge whether the buffer data exists on the node.

The registration sub-module 812 is configured to obtain the video-on-demand service information corresponding to the buffer data from the RRS 4 when the buffer judging sub-module 811 judges that the buffer data exists on the node, and is configured to perform the information registration of the buffer data according to the video-on-demand service information.

The mode selection module 82 is configured to select the live broadcasting service or the video-on-demand service, and report to the relevant ES.

The information obtaining module 83 is configured to receive the live broadcasting network topology information or the video-on-demand network topology information required by the live broadcasting service or the video-on-demand service selected by the mode selection module 82, and a judgment result on whether to buffer the data flow corresponding to the live broadcasting service or the video-on-demand service.

The storage module 84 is configured to obtain the data flow according to a selection result of the mode selection module 82, and buffer the data according to the judgment result obtained by the information obtaining module 83. The storage module 84 includes a downloading sub-module 841 and a buffer sub-module 842.

The downloading sub-module 841 is configured to obtain the corresponding data flow according to the selection result of the mode selection module 82.

The buffer sub-module 842 is configured to buffer the data flow according to the judgment result obtained by the information obtaining module 841.

Figure 9:
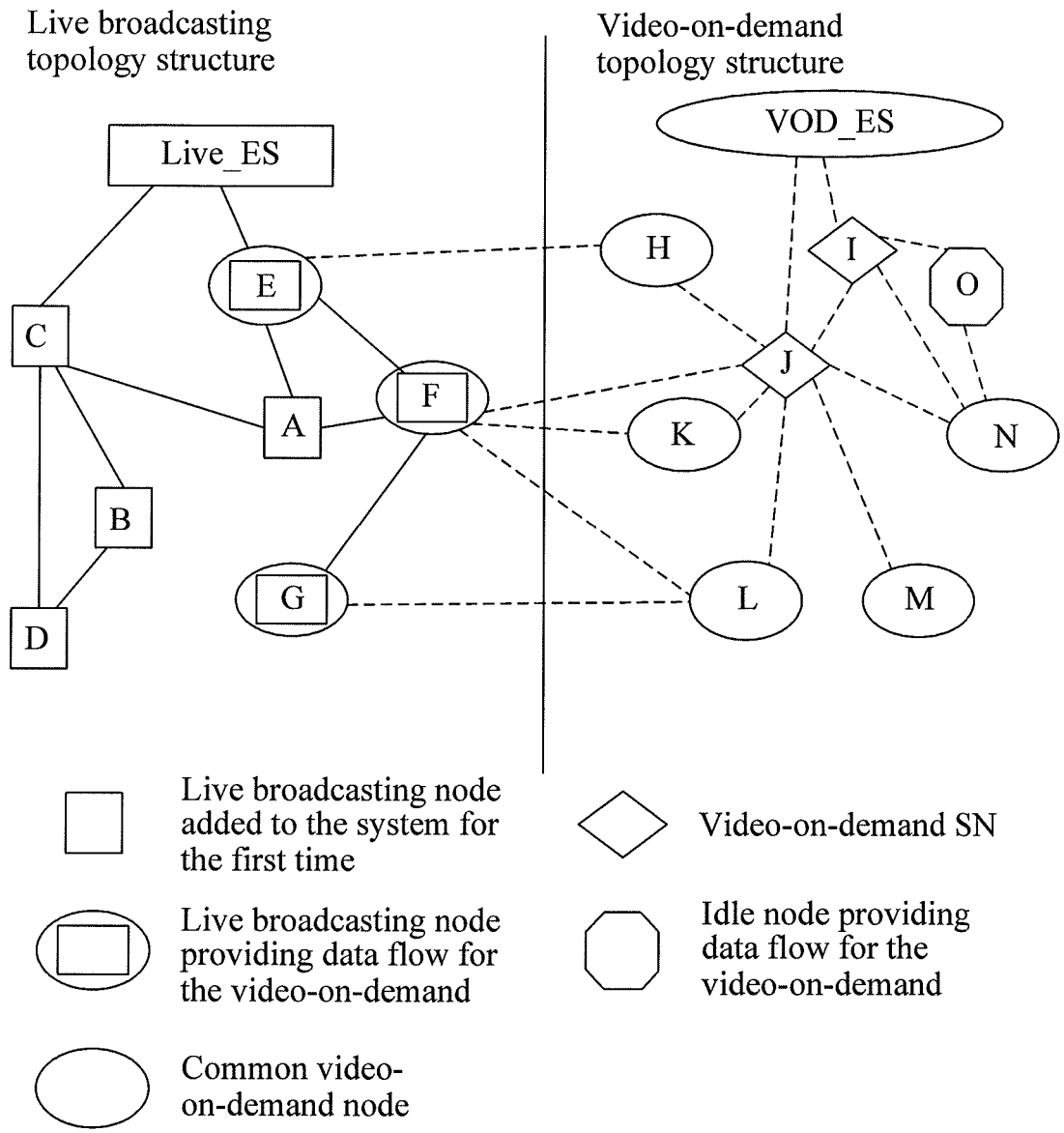
FIG. 9 is a schematic topology diagram of the P2P based system for playing media according to the embodiment of the present invention.

FIG. 9 is a schematic topology diagram of the P2P based system for playing media according to the embodiment of the present invention. Referring to FIG. 9, a left part shows nodes viewing the live broadcasting program, and a right part shows the nodes in the video-on-demand mode and the idle state.

The live broadcasting topology is connected by real lines, and nodes relevant to the video-on-demand are connected by dashed lines, so as to form the video-on-demand topology network.

The nodes E, F, and G play a dual-role in the system, in which the self application is the live broadcasting mode, and in the live broadcasting mode network topology; and the data buffered in the disks is utilized by the video-on-demand nodes, such that the nodes provide the data flow in the video-on-demand topology.

The nodes A, B, C, and D view the program in the live broadcasting mode, generally, the nodes enter the system for the first time, such that the disk buffer is empty, and no data block may be utilized by the video-on-demand, such that the nodes only exist in the live broadcasting application. However, the nodes register at the video-on-demand SN of the program, and once the nodes finish downloading the buffer data block, the nodes report and then are added to the video-on-demand topology.

The nodes I and J represent the SNs in the video-on-demand topology, and the node O is the idle node not viewing the program, but the disk has the buffer data, and the node O is added to the video-on-demand topology structure. The nodes H, K, L, M, and N represent common nodes in the video-on-demand mode.

The nodes H, I, J, K, L, M, and N view the program in the video-on-demand mode, and obtain the video flow in three manners. The nodes obtain the video flow from the VOD_ES; the nodes obtain the video flow from the nodes of the video-on-demand topology structure (in the video-on-demand mode (for example, H) or in the live broadcasting mode (for example, F)); or the nodes obtain the video flow from the idle node (for example, O) not viewing the program but having the data in the disk buffer.

Based on the network topology structure, the node may realize the switch between the live broadcasting mode and the video-on-demand mode.

Figure 10:
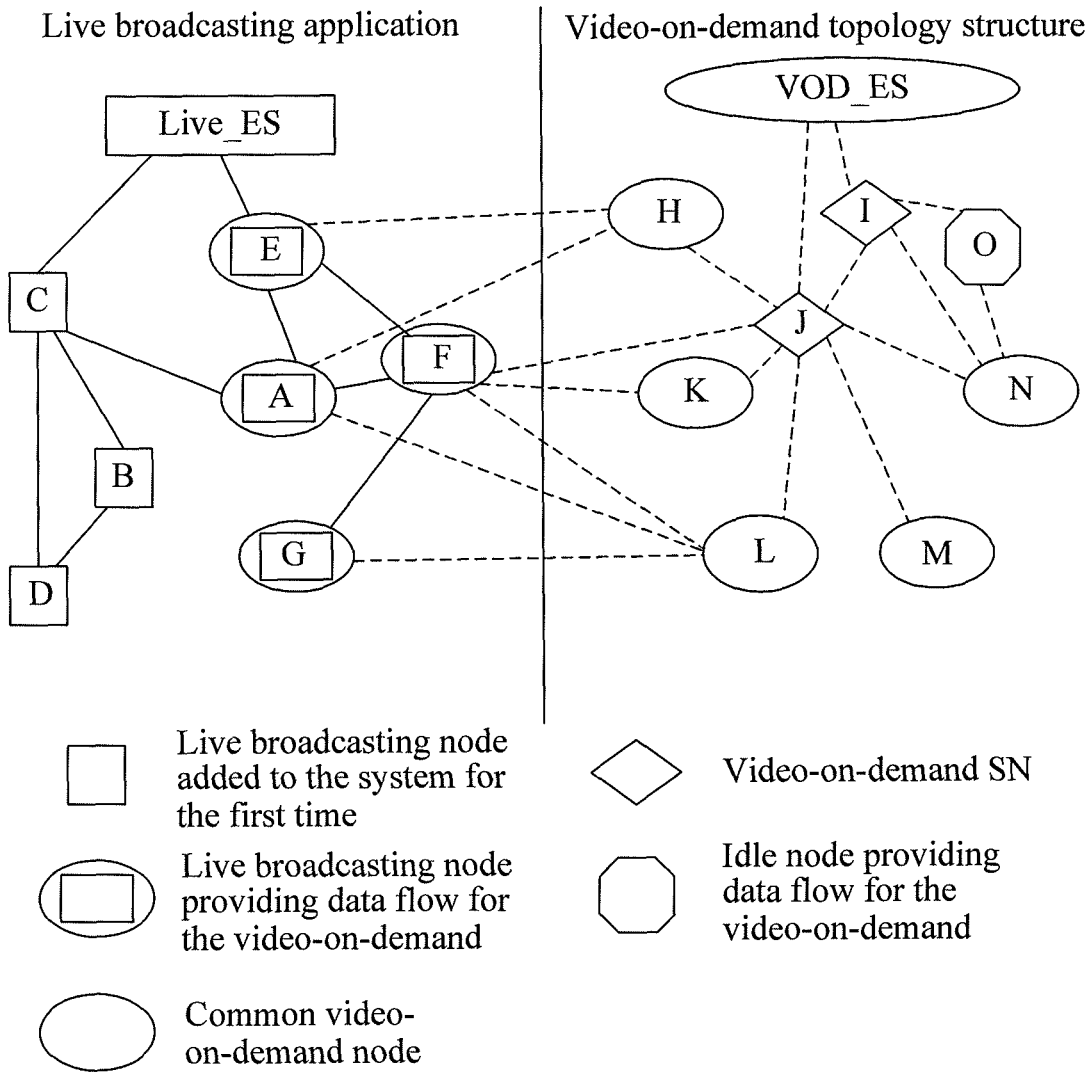
FIG. 10 is a schematic topology diagram of a live broadcasting node subsequently added with a video-on-demand according to an embodiment of the present invention.

In FIG. 9, after a period of time, the node A in the live broadcasting mode buffers the video data, and adds to the video-on-demand topology, so as to provide the data flow for the node H and the node L as a content provider. However, the node A still views the program in the live broadcasting mode, and the live broadcasting topology remains unchanged, as shown in FIG. 10.

Figure 11:
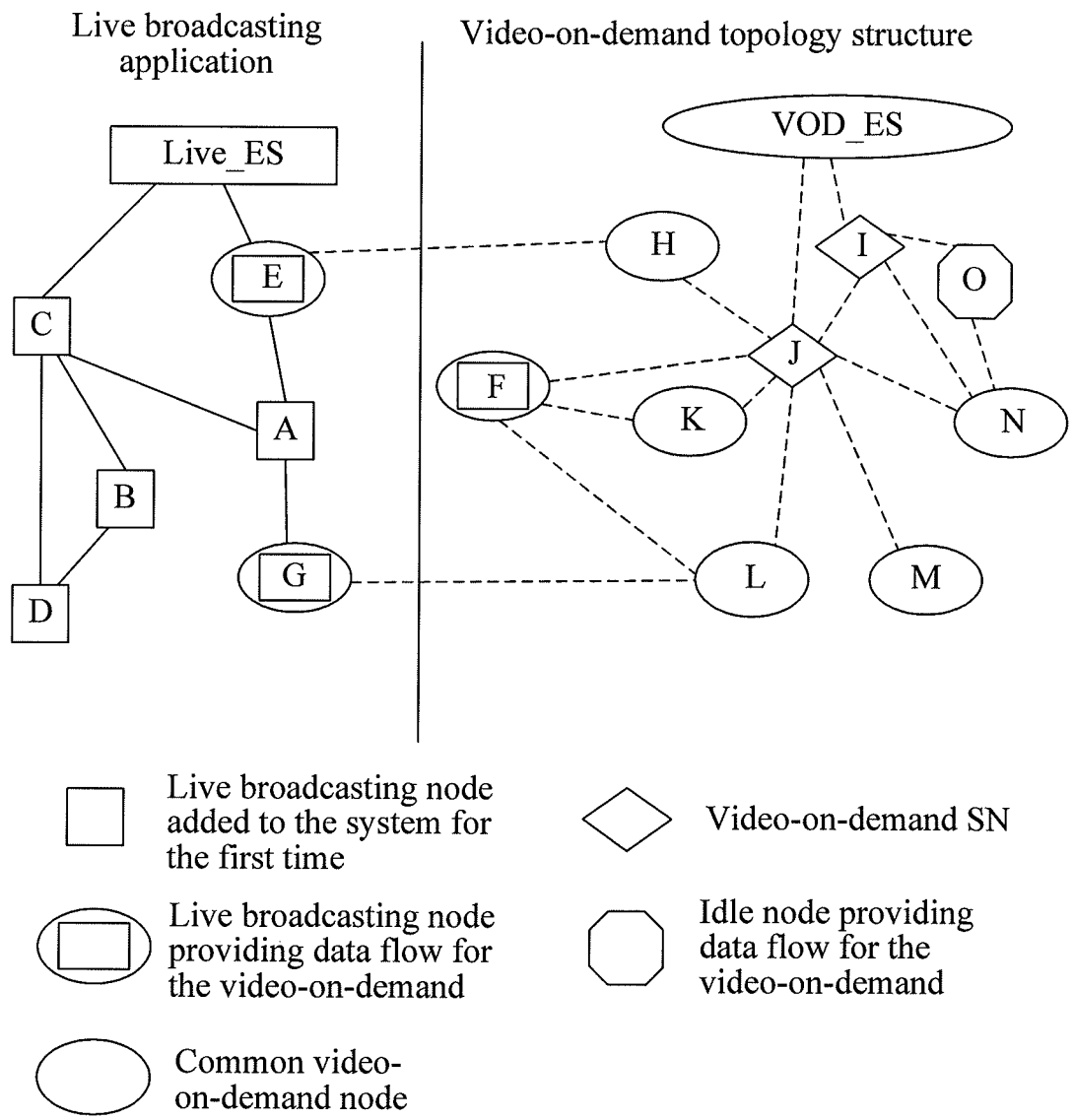
FIG. 11 is a schematic topology diagram of a node switching from a live broadcasting mode to a video-on-demand mode according to an embodiment of the present invention.

At this time, the program viewing mode of the node F in FIG. 9 is switched from the live broadcasting mode to the video-on-demand mode, so the node F needs to exit from the live broadcasting topology, and only exists in the video-on-demand topology diagram to become a video-on-demand node. If the node F exits from the live broadcasting topology, the relation of the nodes of the topology diagram is necessarily changed, and here, the live broadcasting topology needs to know the effect caused by the exiting of the node F on other nodes, and quickly takes measures. For example, after the node F exits from the live broadcasting topology, the node G is isolated in the live broadcasting topology, and cannot obtain the live broadcasting video flow. At this time, the node G is associated with other nodes in the live broadcasting topology, for example, connects with the node A, so as to ensure that the data is normally obtained, as shown in FIG. 11.

Figure 12A:
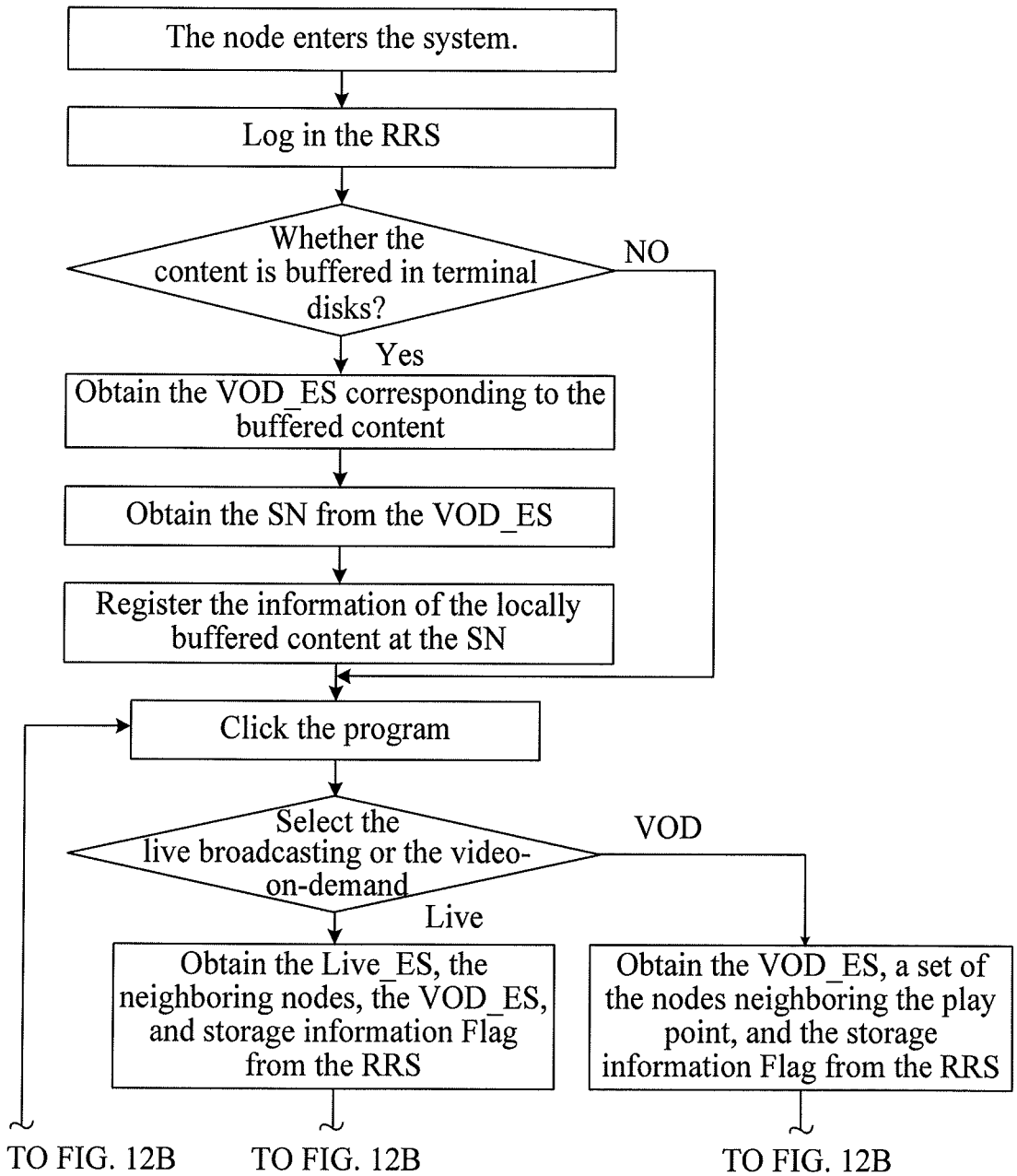
FIG. 12 is a schematic flow chart on a client of a P2P based method for playing media according to an embodiment of the present invention.
Figure 12B:
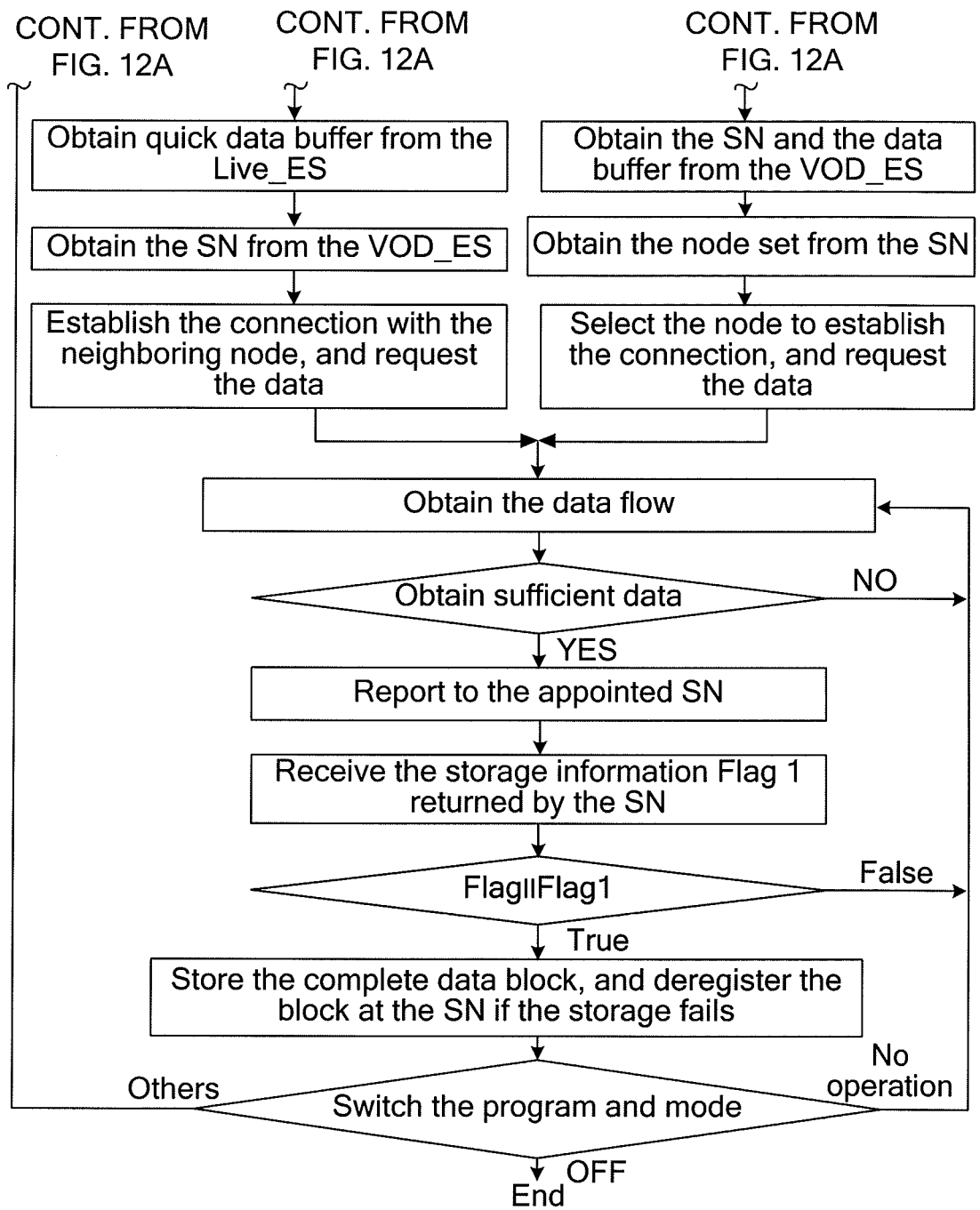

Particularly, referring to FIG. 12, a detailed flow chart of the technical solution according to the embodiment of the present invention is shown.

A node enters the system, and logs in the network through the RRS.

The node judges whether the relevant content is buffered by itself, and if yes, the node obtains the VOD_ES corresponding to the buffered content, obtains the corresponding SN through the VOD_ES, and registers the information of the buffered content at the SN.

After the node finishes registration, or judges that the content is not buffered in itself, the node selects the program content required to be obtained, and determines whether to obtain the content through the live broadcasting mode or the video-on-demand mode.

If the node selects the live broadcasting mode, the node obtains the information of the corresponding Live_ES, the corresponding VOD_ES, and the corresponding neighboring nodes, and an identifier on whether to buffer the content from the RRS, and then obtains the data flow through the information.

If the node selects the video-on-demand mode, the node obtains the information of the corresponding VOD_ES and the corresponding neighboring node set, and the identifier on whether to buffer the content from the RRS, and then obtains the data flow through the information.

After the sufficient data content is obtained, the node judges whether to buffer the content according to the identifier on whether to buffer the content. Particularly, the node judges whether to buffer the file level content, and if yes, the corresponding file level content is stored, and if no, it is further judged whether to buffer the block level content, in which if yes, the content block is buffered, and if no, the content block is not buffered. After buffering the content, the node is further used as the content source of the video-on-demand, and provides the content for other nodes selecting the video-on-demand.

Meanwhile, the process further includes the switching between the live broadcasting mode and the video-on-demand mode.

For ease of description, in the embodiment of the present invention, the entire procedure is divided into five parts, and is described with reference to the accompanying drawings. The detailed description is given in the following.

Figure 13:
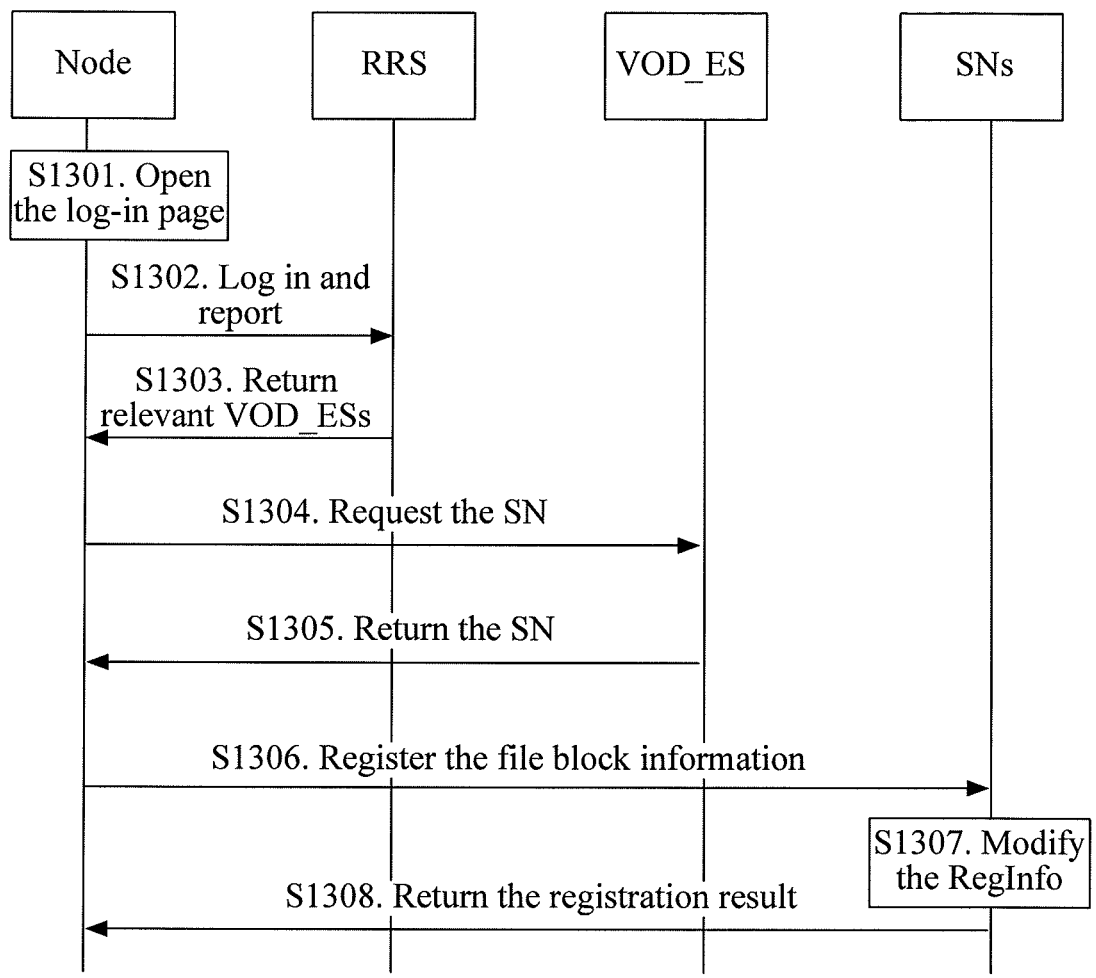
FIG. 13 is a schematic flow chart of a log-in process of a node according to an embodiment of the present invention.

Referring to FIG. 13, the first part is a node log-in process. The node enters the system, and firstly contacts with the RRS to log in the network. If the node is first time to use the system, the disk buffer of the node is empty. The node does not report the data to the RRS, but only logs in the network. Otherwise, the node reports the data to the RRS, the RRS returns the information of the VOD_ES corresponding to the content buffered in the disk, then the node obtains the corresponding SN, and the SN registers the information of the content block buffered in the node.

It should be noted that the node may only perform this step, that is, the node only opens the terminal, but does not continue to select the live broadcasting mode or the video-on-demand mode. The condition is particularly appropriate to a set top box application. In such case, the disk buffer file of the node may be utilized by the video-on-demand nodes in the topology, so as to provide the data flow for the video-on-demand nodes.

Correspondingly, FIG. 13 shows a schematic flow chart when the user logs in, which is irrelevant to whether the user subsequently enters the live broadcasting, the video-on-demand, or maintains the existing idle state. The process includes the following steps.

In Step S1301, the node opens a log-in page.

In Step S1302, the node logs from the RRS, and reports the buffered content data.

In Step S1303, the RRS returns a set of VOD_ESs relevant to the buffered content.

If the node disk does not have the buffer data, the RRS is only used for log-in of the node, but does not return the information of the VOD_ES.

In Step S1304, after obtaining the information of the VOD_ES, the node is connected to the VOD_ES.

In Step S1305, the VOD_ES returns the information of the SN of each content.

In Step S1306, the node reports the content block information to the SN.

In Step S1307, the SN modifies the data structure RegInfo in the SN accordingly, and records the newly added node and the content block information.

In Step S1308, the SN returns a registration result.

The different contents may be registered at the same SN, or different SNs, and the VOD_ES may also serve as an SN.

Figure 14:
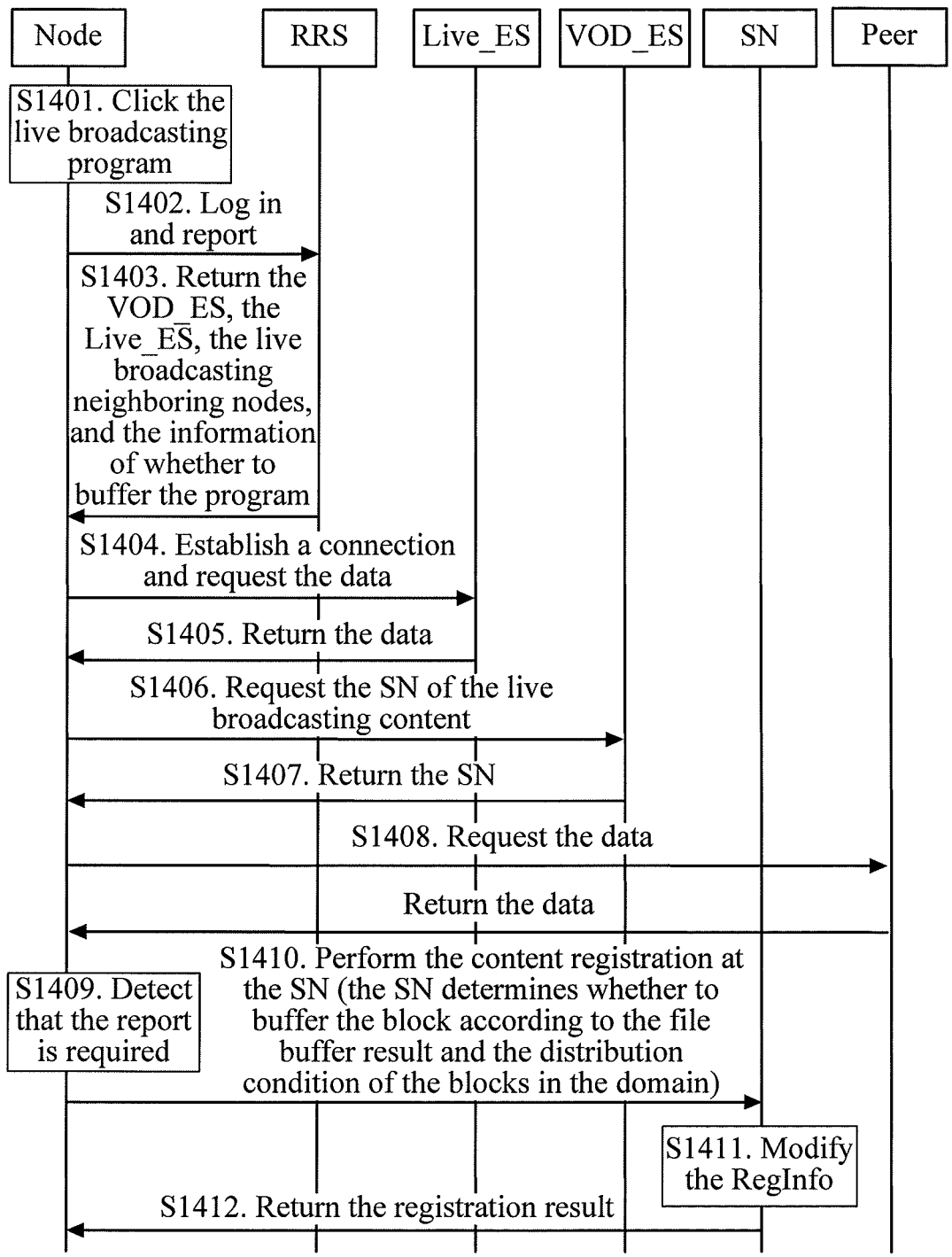
FIG. 14 is a schematic view of an operation process of the live broadcasting mode according to an embodiment of the present invention.

Referring to FIG. 14, the second part is an operation process of the live broadcasting mode. In the live broadcasting mode, the node contacts with the RRS, obtains the information of the Live_ES and the information of the neighboring nodes, and then establishes the connection with the Live_ES and the neighboring nodes, such that the node is added to the live broadcasting topology. Meanwhile, the node obtains the VOD_ES of the live broadcasting content from the RRS, and establishes the connection with the VOD_ES, so as to obtain the information of the SN.

Afterwards, the node obtains or receives the data flow of the live broadcasting from the live broadcasting neighboring nodes. The RRS returns a feedback on whether to store the data according to popularity of the program, and determines whether the newly added node should buffer the obtained data flow. If a new node is added to the program, and if the number of the node users currently using the content is greater than a set file level threshold N1, the RRS returns storage flag information Flag=0 (not buffered) to the node; otherwise, the RRS returns the Flag=1 (buffered).

When the live broadcasting node obtains a part of the complete content block, the live broadcasting node contacts with the SN to register the content block (the SN sets a content block level threshold N2 of the content in the managed domain, and if PeerNum corresponding to the part of the content block BlockID is greater than the content block level threshold N2, the SN returns Flag1=0 indicating that the content block needs not to be stored, otherwise, returns Flag1=1).

When subsequently viewing the program, the node obtains the newly downloaded files of the program, such that the node periodically detects whether the content blocks (for example, 4M is one Block) are already downloaded, and registers and reports the information to the SN, so as to determine whether to store the downloaded content blocks in the disks. If the node in the live broadcasting mode buffers the new content, the node may be added to the video-on-demand topology of the content, and provides the data flow for the video-on-demand nodes.

The node in the live broadcasting state may be in a dual structure. In the live broadcasting topology structure, the node in the live broadcasting state serves itself and other live broadcasting nodes; and in the video-on-demand topology, the node in the live broadcasting state provides the buffered data for the nodes in the video-on-demand mode. If a certain node in the video-on-demand mode buffers the content of a certain live broadcasting program, the node in the video-on-demand mode may also be used as the node in the live broadcasting mode. As compared with the video-on-demand, the live broadcasting has a relatively stable topology structure, a relatively stable data flow providing, and a guaranteed quality, and the node in the video-on-demand mode is not required to provide the data flow support for the node viewing the live broadcasting. Therefore, the logged-in idle node may not be added to the live broadcasting topology.

Particularly, referring to FIG. 14, a signaling interaction process of the live broadcasting mode includes the following steps.

In Step S1401, the node selects the content to enter the live broadcasting mode.

In Step S1402, the node establishes the connection with the RRS for performing the interaction.

In Step S1403, the node obtains the information of the ESs (including the Live_ES and the VOD_ES corresponding to the content) and the neighboring nodes.

The RRS determines whether the newly added node should buffer (that is, file-level buffer) the live broadcasting content according to the live broadcasting topology condition of the program.

In Step S1404, the node establishes the connection with the Live_ES for performing the interaction.

In Step S1405, the node obtains quick view data buffer from the Live_ES, and this step is optional.

In Step S1406, the node establishes the connection with the VOD_ES of the content for performing the interaction.

In Step S1407, the node obtains the information of the SN of the content.

In Step S1408, the node interacts with the Peers indicated in the information of the SN, and obtains the required content data.

The node is added to an appropriate position in the live broadcasting topology, establishes connection with the neighboring nodes to view the program, and downloads the data from the neighboring nodes or the Live_ES.

In Step S1409, the node detects whether a part of the complete content block is downloaded, and if yes, the node registers the content block, and the procedure proceeds to Step S1410; otherwise, the procedure returns to Step S1408, and the node continues to obtain the data.

In Step S1410, the node registers the information of the file block at the SN. The SN determines whether to buffer the block (here the content block is buffered, if the judgment result on the file level buffer is true, the judgment here is not required, and the node directly stores and registers the data at the SN) according to the file buffer result and the storage condition of the content blocks in the managed domain.

In Step S1411, the SN modifies the data structure RegInfo, and keeps on synchronously updating the data.

In Step S1412, the SN returns a registration result.

It should be further noted that the user registration and the data obtaining are synchronous, and only when the entire content is already downloaded, the entire process is ended.

Figure 15:
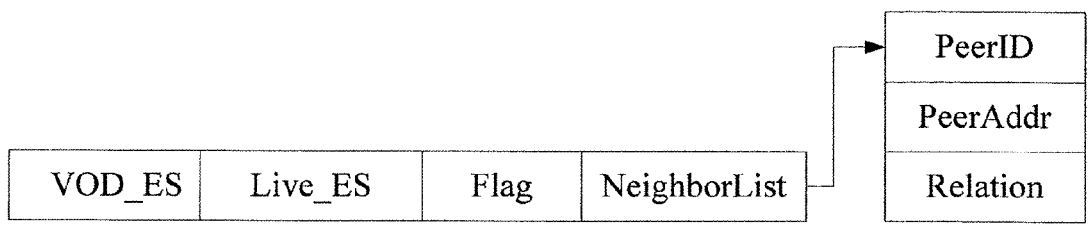
FIG. 15 is a list of a data structure returned by the RRS under the live broadcasting mode according to an embodiment of the present invention.

A data structure returned by the RRS to the live broadcasting user through the interaction is as shown in FIG. 15.

VOD_ES represents the video-on-demand ES of the live broadcasting program.

Live_ES represents the live broadcasting ES of the live broadcasting program.

Flag represents a flag bit on whether to buffer the program, 1 represents yes, and 0 represents no.

NeighborList represents the neighboring nodes of the program in the live broadcasting topology, in which the List has a data structure, PeerID represents an unique identifier of the node in the system, PeerAddr represents an Internet Protocol (IP) address of the node, Relation represents a relation between the node and the requesting node, including that the node is a grandparent node, a parent node, a child node, or a grandchild node of the requesting node. The requesting node is only connected to the parent node and the child node. The requesting node obtains the data from the parent node, and transmits the data to the child node. When one kind of node is off line, other nodes notify and obtain the replaced kind of the node.

Figure 16:
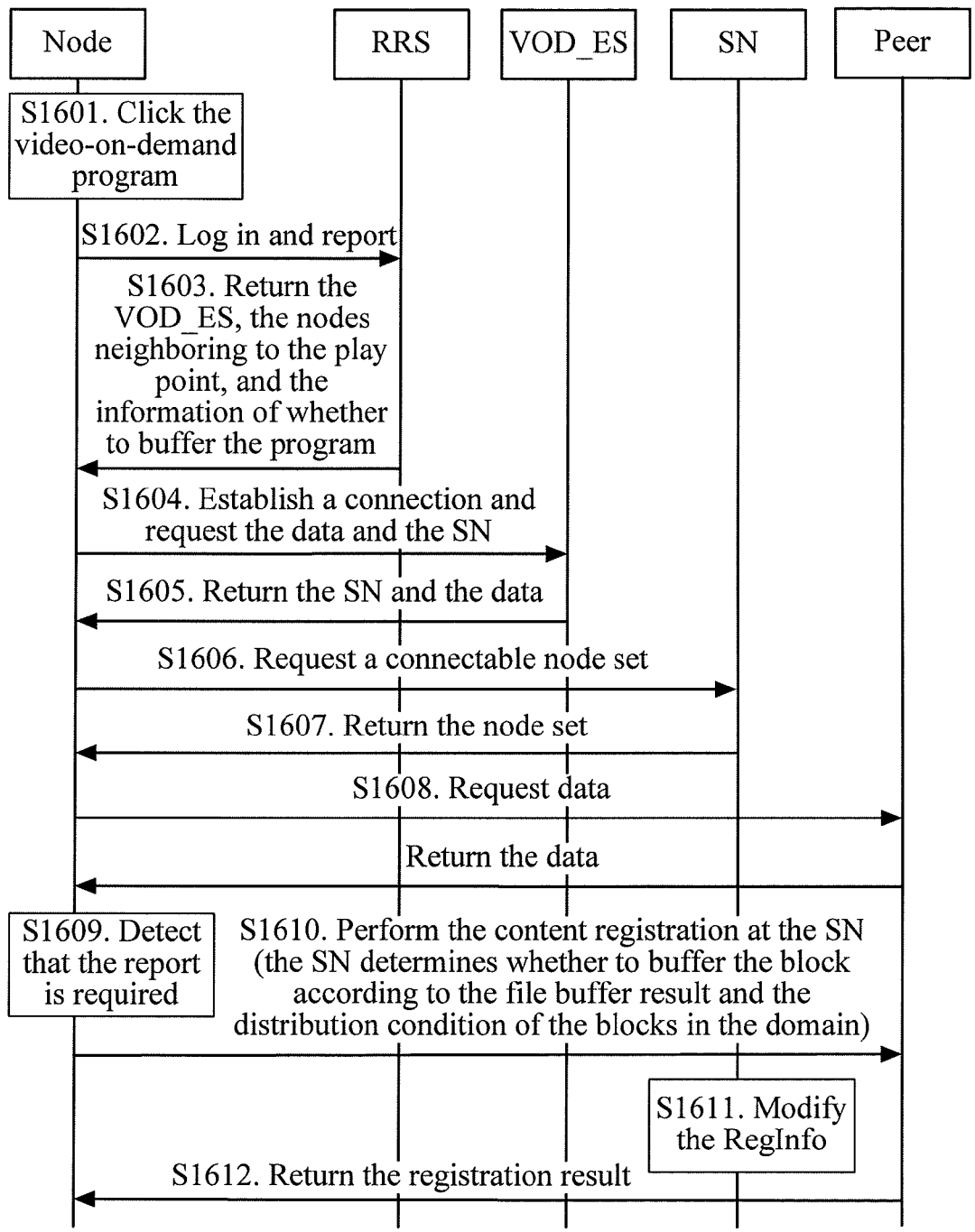
FIG. 16 is a schematic view of an operation process of the video-on-demand mode according to an embodiment of the present invention.

Referring to FIG. 16, a third part is an operation process of the video-on-demand mode.

The node obtains the information of the nodes having the close video-on-demand time point of the same program required by the node from the RRS. Further, it is judged whether the added node stores the downloaded data in the disks, that is, the file level storage, according to the state of the system. If the number of the node user currently using the content is greater than the set file level threshold N1, the RRS returns storage flag information Flag=0 (not store) to the node; otherwise, the RRS returns the Flag=1 (store).

The node sends the request of obtaining the content to the VOD_ES, and obtains the information of the SN relevant to the requested content. Meanwhile, the node obtains the quick buffer data through the VOD_ES (the step is optional), and selectively establishes the connection with the obtained node, so as to obtain the content data.

If the node is added to the video-on-demand system of the content for the first time, or the currently available nodes are insufficient, the node initiates a node query request to the SN, so as to obtain the node. According to the local registration state (the video-on-demand mode, the live broadcasting mode, or the idle state) of each node, the SN gives a return to the node according to a policy, in which the node in the idle state is preferentially selected, then the node in the video-on-demand mode is selected, and finally the node in the live broadcasting mode is selected. The selection reason is that the node in the idle state has the sufficient idle resource, and the live broadcasting node stably and continuously obtains and transmits the data in the topology architecture, and consumes bandwidths.

When the video-on-demand node obtains a part of complete content block, the video-on-demand node contacts with the SN to register the content block (the SN sets the content block level threshold of the content in the managed domain as N2, if PeerNum corresponding to the part of the content block BlockID is greater than N2, the SN returns that the block needs not to be stored, Flag1=0; otherwise, Flag1=1).

Particularly, referring to FIG. 16, a schematic flow chart of the video-on-demand mode is shown, and the process includes the following steps.

In Step S1601, the user selects the video-on-demand program to enter the video-on-demand mode.

In Step S1602, the node firstly contacts with the RRS.

In Step S1603, the node obtains the information of the VOD_ES from the RRS, and obtains the information of the metadata, the number of the nodes currently using the content (or an identifier on whether to perform file-level buffer on the program content), and the information of the nodes neighboring the play point.

In Step S1604, the node establishes the connection with the VOD_ES for performing the interaction.

In Step S1605, the node obtains quick data buffer (optional) of the program content and the information of the SN.

In Step S1606, the node establishes the connection with the SN.

In Step S1607, the node obtains the connectable node list form the SN, for establishing the connection.

In Step S1608, the node interacts with Peers indicated in the information of the SN, and obtains the required data.

The node establishes the connection with the node selected from the obtained node list or the VOD_ES so as to download data. The SN returns the node having a relatively large downlink bandwidth according to the information of the flag bit of the node.

In Step S1609, the node detects whether a part of complete content block is downloaded, and if yes, the node registers the content block, and the procedure proceeds to Step S1610; otherwise, the procedure returns to Step S1608, and the node continues to obtain the data.

In Step S1610, once the content block is downloaded, the nodes registers the content at the SN, the SN determines whether to buffer the block (if the judgment result on the file level buffer is true, the judgment is not required, and the node directly stores and registers the data at the SN) according to the storage condition of the content in the managed domain.

In Step S1611, the SN modifies the data structure in the SN, and keeps on updating.

In Step S1612, the SN returns a registration result.

The data structure returned by the RRS to the video-on-demand user through the interaction is as shown in Table 6.

TABLE 6

List of Data Structure Returned by RRS Under Video-On-Demand Mode

| VOD_ES | Playpoint Nodes | Flag |
| --- | --- | --- |

VOD_ES represents the video-on-demand ES of the program.

Playpoint Nodes represents the nodes neighboring the play time point of the node.

Flag represents the flag bit on whether to buffer the program, in which 0 represents no, and 1 represents yes.

Figure 17:
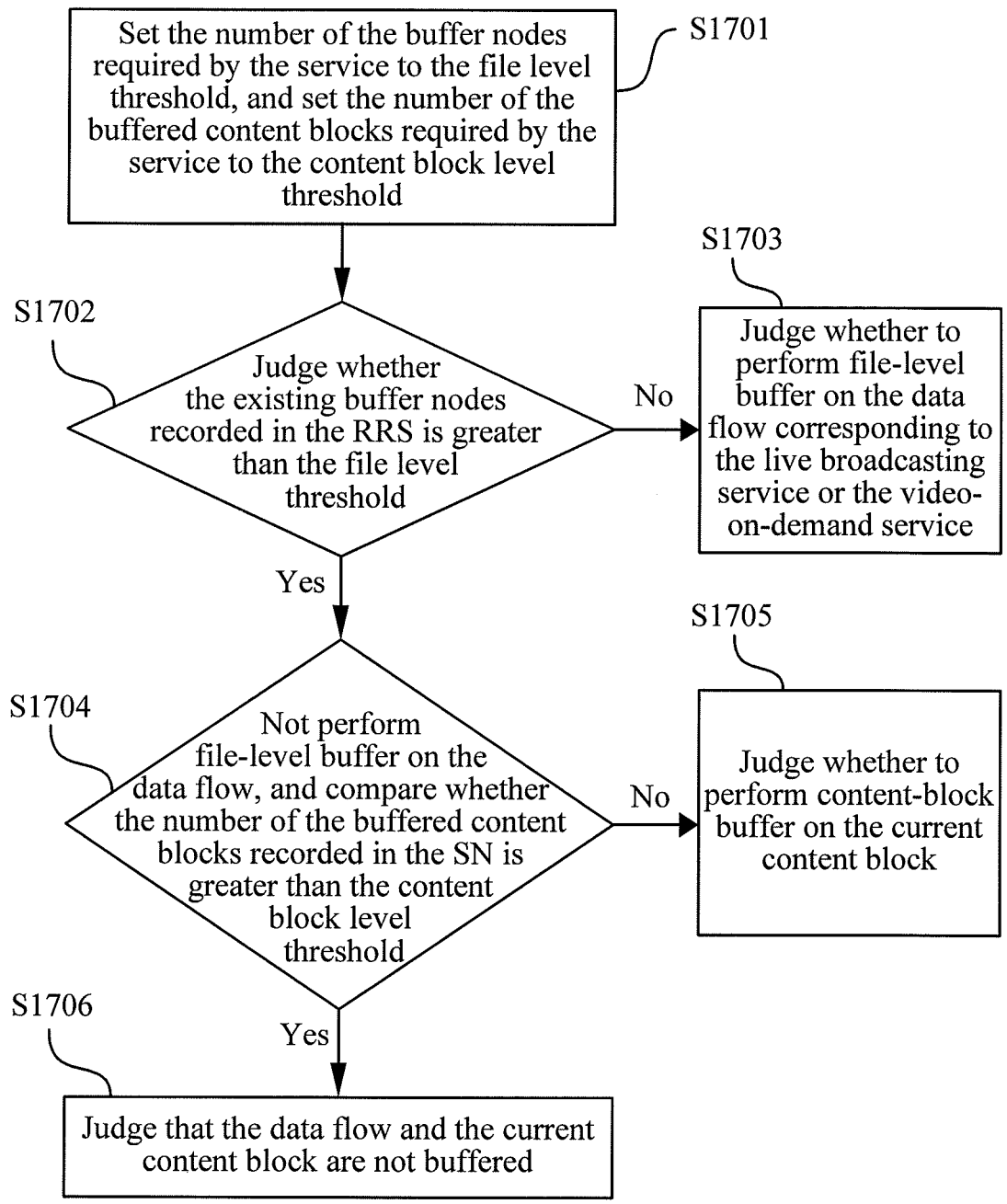
FIG. 17 is a schematic flow chart of judging whether to buffer the content according to an embodiment of the present invention.

Referring to FIG. 17, a fourth part is a process of judging whether to buffer the content.

No matter in the live broadcasting or the video-on-demand, many nodes view the hot programs. For the disk buffer of the program content, a comparison and judgment process exists. It is not necessary to store all programs viewed by all the nodes as the newest content, as the disk volume is limited, the newly stored content replaces the former content, and it is not necessary for each node or most of the nodes in the topology to store the same content.

Referring to FIG. 17, the particular comparison and judgment process includes the following steps.

In Step S1701, the number of the buffer nodes required by the service is set to the file level threshold, and the number of the buffered content blocks required by the service is set to the content block level threshold.

In Step S1702, it is compared whether the existing buffer nodes recorded in the RRS is greater than the file level threshold.

If the number of the existing nodes buffering the data flow corresponding to the live broadcasting service or the video-on-demand service and recorded in the RRS is smaller than the file level threshold, the procedure proceeds to Step S1703.

If the number of the existing nodes buffering the data flow corresponding to the live broadcasting service or the video-on-demand service and recorded in the RRS is greater than the file level threshold, the procedure proceeds to Step S1704.

In Step S1703, it is determined to perform file-level buffer on the data flow corresponding to the live broadcasting service or the video-on-demand service.

If it is judged that the file-level buffer is performed on the data flow, the current content block is disk-buffered. Then, each time when the node downloads a file block, the node saves the file block in the memory instead of immediately writing the file block into the disk, and registers at the SN. After the SN returns the result, the node writes the content from the memory to the disk. Under a default condition, the writing is successful, and the interaction ends. If the writing is not successful, the node sends the message to the SN, and the SN modifies the statistical information of the corresponding content block.

In Step S1704, the data flow is not file-level buffered, and it is compared whether the number of the buffered content blocks recorded in the SN is greater than the content block level threshold.

The node registers at the video-on-demand SN of the content (using the block as a unit), the SN returns the registration result, showing the content block information of its managed node, and the node determines whether to buffer the downloaded block according to the result returned by the SN.

Particularly, when the number of the buffered content blocks recorded in the SN is smaller than the content block level threshold, the procedure proceeds to Step S1705.

When the number of the buffered content blocks recorded in the SN is greater than the content block level threshold, the procedure proceeds to Step S1706.

In Step S1705, it is determined to perform content-block buffer on the current content block.

In Step S1706, it is judged that the data flow and the current content block are not buffered.

That is to say, when a file level comparison (the nodes viewing the program in the topology) exceeds a threshold value and a microscopic content block comparison (the storage amount of the file block in the SN managed domain) exceeds a threshold value, the file and the content block are not stored.

Figure 18:
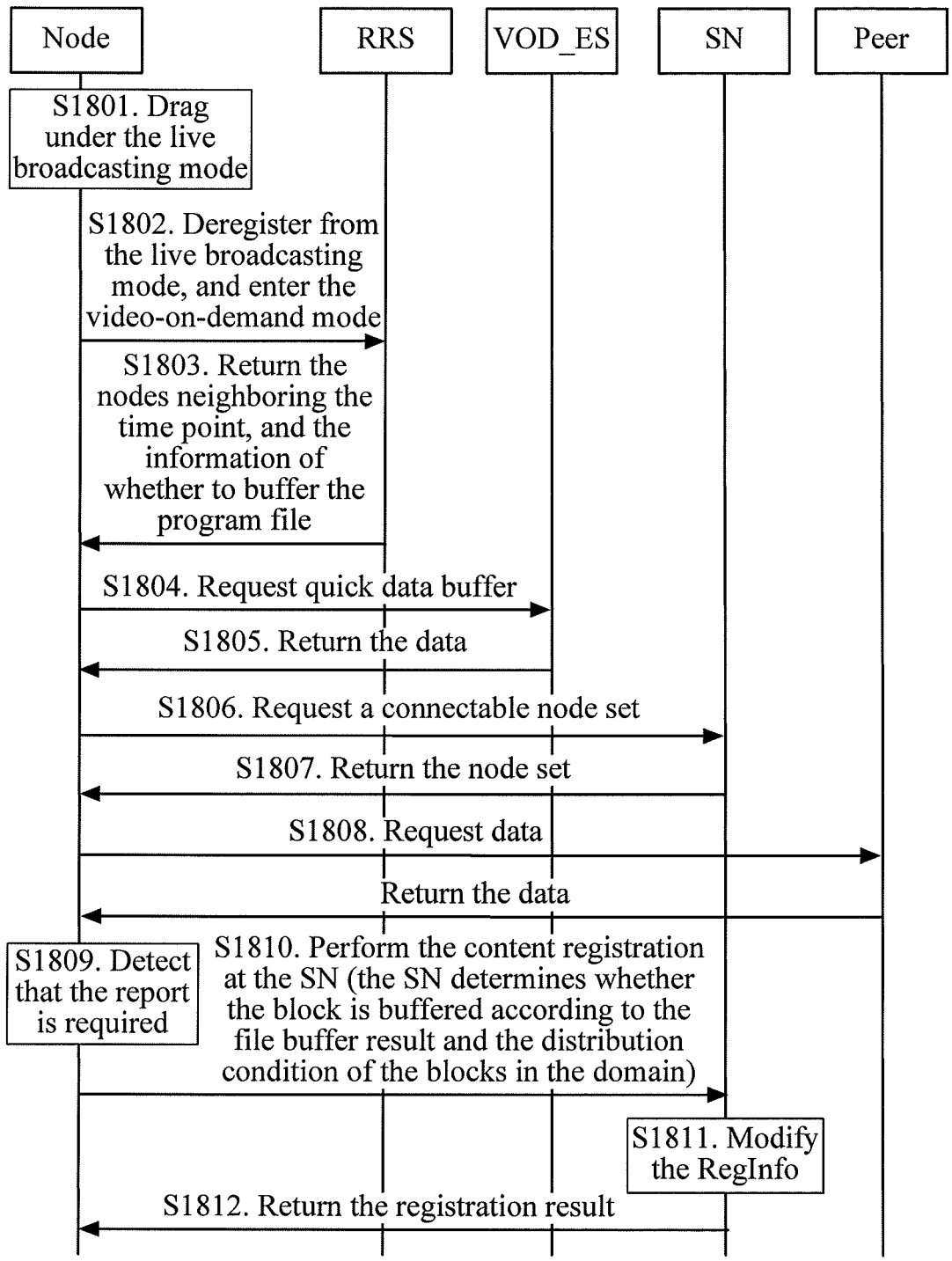
FIG. 18 is a schematic view of an operation process of switching from the live broadcasting mode to the video-on-demand mode by dragging the live broadcasting node according to an embodiment of the present invention.

Referring to FIG. 18, a fifth part is an operation process of realizing the switch from the live broadcasting mode to the video-on-demand mode by dragging the live broadcasting node.

During the program playing procedure, the node may switch the program or the mode at any moment, the node drags the live broadcasting node to enter the video-on-demand mode, drags the video-on-demand node, or switches the program. When switching from the live broadcasting mode to the video-on-demand mode, the node exits from the live broadcasting topology, keeps the position in the video-on-demand topology, then obtains the information of the SN and the quick data buffer from the Vod_ES of the video-on-demand content, and obtains the connectable node set of the drag point from the SN. The subsequent operation is similar to the operation of entering the video-on-demand.

When the node switches from the live broadcasting mode to the video-on-demand mode, usually a mode of obtaining the video flow is changed. In such case, the node needs to exit from the live broadcasting topology diagram, and is added to the video-on-demand topology diagram. Alternatively, the node maintains the position in the live broadcasting topology diagram, so as to avoid the live broadcasting topology structure from being frequency changed, thereby reducing disturbances. Under the latter condition, the video-on-demand node forwards the video flow as an intermediate node in the live broadcasting topology. This condition has the advantage that the live broadcasting topology structure is stabilized, so as to avoid the exiting operation, and the disadvantage that the live broadcasting topology structure may become quite gigantic, and many intermediate nodes do not directly requires to provide the play flow in the live broadcasting mode. Therefore, it is selected that the node exits from the live broadcasting topology, as shown in FIG. 11. Generally, after one node enters the video-on-demand mode, a probability of synchronizing with the live broadcasting is extremely small after a certain time, and the condition that the video-on-demand node of a certain program subsequently enters the live broadcasting mode of the program may not be considered.

Referring to FIG. 18, it is a schematic view of the signaling interaction in which the node enters the video-on-demand node by dragging the live broadcasting node. When switching from the live broadcasting mode to the video-on-demand mode, the node needs to exit from the live broadcasting topology, and obtains the information of the node of the play time point after the dragging. The process particularly includes the following steps.

In Step S1801, the user drags the live broadcasting node under the live broadcasting mode.

In Step S1802, the node registers at the RRS that the node exits from the live broadcasting mode and switches to the video-on-demand mode, and the switched play point. The node notifies the RRS that the node exits from the live broadcasting list and enters the video-on-demand list, and the RRS modifies the saved data accordingly, so as to meet the current actual condition of the node.

The data structure sent by the node to the RRS is as shown in Table 7.

TABLE 7

List of Data Structure Sent by Node to RRS when Switching from Live Broadcasting Mode to Video-On-Demand Mode

| ContentID | PeerID | SwitchFlag | SwitchPoint |
|-----------|--------|------------|-------------|

ContentID represents an ID of the program content.

PeerID represents an ID of node.

SwitchFlag represents a flag bit on which the node switches from the live broadcasting mode to the video-on-demand mode.

SwitchPoint represents the play time point after the node switches to the video-on-demand.

In Step S1803, the RRS returns the information of the node of the play time point after the dragging, allowing for selecting the node when establishing the connection.

In Step S1804, the node detects whether the sufficient data locally exists, and if no, the node requests the quick data buffer from the VOD_ES.

In Step S1805, the VOD_ES returns the data to the node, so as to reduce a drag delay.

In Step S1806, the node requests the node having the registered requested data from the SN.

In Step S1807, the node obtains the node list from the SN.

In Step S1808, the node interacts with the Peers, so as to obtain the required data.

In Step S1809, the node detects whether a part of the complete content block is downloaded, and if yes, the node registers the content block, and the procedure proceeds to Step S1810; otherwise, the procedure returns to Step S1808, and the node continues to obtain the data.

In Step S1810, after the certain content blocks are downloaded, the node registers the information at the SN. The SN determines whether to buffer the block (if the judgment on the file-level buffer Num-File<N1 is true, the judgment is not required, and the node directly stores and registers the data at the SN) according to the storage condition of the content block in the managed domain.

In Step S1811, the SN modifies the data structure RegInfo.

In Step S1812, the SN returns a registration result.

It should be further noted that for the original live broadcasting topology, the node ready to exit the mode may have two selections. The node actively initiates an exiting request, for example, initiates an existing notification to the Live_ES or the neighboring nodes, and thus, the self-organizing network may actively reply to the change of the topology structure. The other method is passive, the node does not actively notify the nodes in the live broadcasting topology but directly exits, and the neighboring nodes detect the exiting of the node, and then are self-adaptive by adopting the policies.

Figure 19:
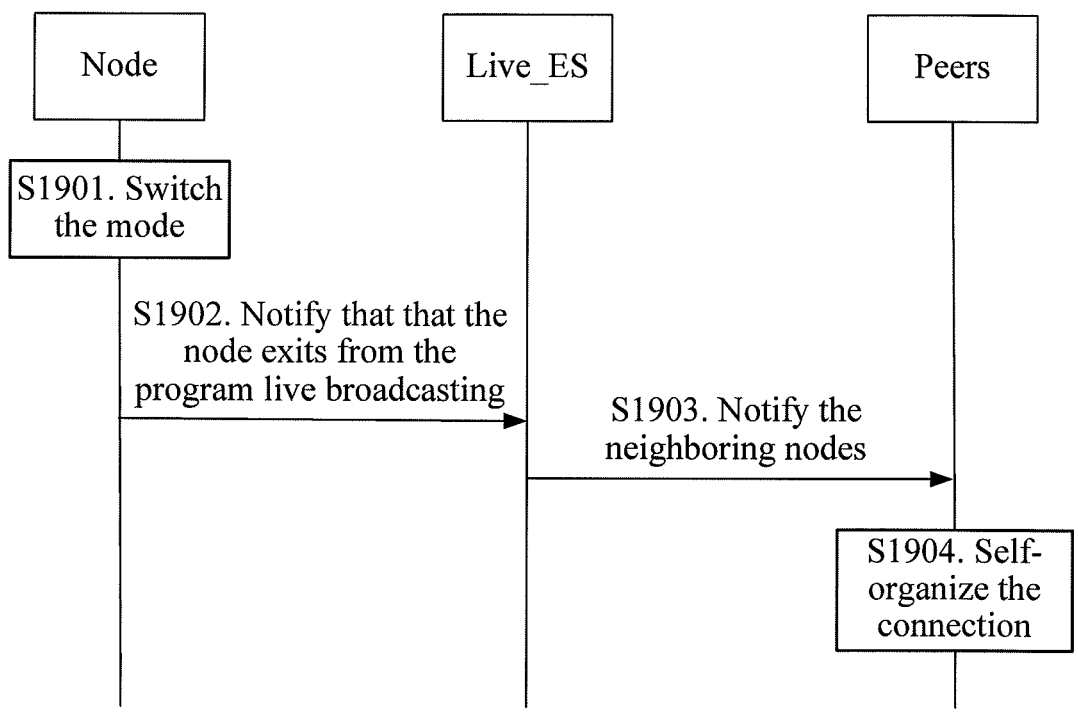
FIG. 19 is a schematic flow chart of a node exiting from the live broadcasting according to an embodiment of the present invention.

Referring to FIG. 19, it is a schematic flow chart of the first exiting solution. The node interacts with the Live_ES, and notifies the Live_ES that the node will switch to the video-on-demand mode. The process includes the following steps.

In Step S1901, the user selects the switch mode, and enters the video-on-demand.

In Step S1902, when exiting, the node actively sends a notification, so as to notify the Live_ES.

In Step S1903, the Live_ES sends the notification to other nodes.

In Step S1904, the network self-organizes a dynamic adjustment, so as to reply to the change of the node in the network.

In another aspect, in addition to the above procedure of switching from the live broadcasting mode to the video-on-demand mode, the technical solution of the present invention further includes other switching processes in the following.

1. A Process that the Live Broadcasting Node Switches the Program

The procedure that the live broadcasting node switches the program is similar to the procedure of selecting the program for the first time, except that the live broadcasting node keeps the position in the video-on-demand topology, notifies the corresponding SN of modifying the state information of the node, and exits the live broadcasting topology in the last program.

2. A Video-on-Demand Node Switching Process

The video-on-demand node may switch to enter the live broadcasting mode, switch the program to enter the video-on-demand or the live broadcasting.

The procedure of switching to enter the live broadcasting mode is similar to the procedure of entering the live broadcasting mode for the first time, in which the video-on-demand node keeps the position in the video-on-demand topology, the SN modifies the state information of the node, and the video-on-demand node enters the live broadcasting topology of the new program. The procedure of switching the program to enter the video-on-demand or the live broadcasting is similar to the interaction of entering the video-on-demand and the live broadcasting for the first time, in which the video-on-demand node keeps the position in the original video-on-demand topology diagram, and notifies the SN having the registered buffer data of modifying the state of the node.

The above switching procedures are within the protection scope of the present invention.

The technical solutions of the embodiments of the present invention have the following advantages. By fully utilizing characteristics of the live broadcasting service and the video-on-demand video service, the live broadcasting and video-on-demand video service can be interfused to realize a free switch from the live broadcasting to the video-on-demand. Meanwhile, a disk-buffer method is modified, such that program sources may be uniformly distributed and connectable nodes are increased, and the data buffered in user node disks is applied to the video-on-demand. In addition, according to a source distribution condition, the system judges whether to buffer the currently viewed program, such that sufficient contents are ensured to be used for network applications, thus avoiding waste caused by the over much content stored repeatedly, increasing the utilization ratio of network resources, and improving the use experience of users.

Through the above description in the detailed description, it is clear to persons skilled in the art that the present invention may be accomplished through hardware, or through software plus necessary universal hardware platform. Base on this, the technical solutions of the present invention may be embodied in the form of a software product. The software product may be stored in one or more nonvolatile storage media (for example, CD-ROM, USB flash drive, or removable hard disk) and contain several instructions configured to instruct a computer equipment (for example, a personal computer, a server, or a network equipment) to perform the method according to the embodiments of the present invention.

The above descriptions are merely preferred embodiments of the present invention. It should be noted by persons of ordinary skill in the art that modifications and improvements may be made without departing from the principle of the present invention, which should be construed as falling within the scope of the present invention.

What is claimed is:

1. A peer-to-peer (P2P) based method for playing media content, comprising:
    logging into a network by a first node, wherein;
        the network includes a plurality of interconnected nodes each arranged in one of a live broadcasting topology portion and a video-on-demand topology portion of the network, the live broadcasting topology portion is different and separate from the video-on-demand topology portion without sharing a common root node, wherein at least some of the nodes that are part of the live broadcasting topology and at least some of the nodes that are part of the video-on-demand topology correspond to end user nodes and the live broadcasting topology portion and the video-on-demand topology portion each provide different media content originated from different root nodes,
    wherein the first node corresponds to an end user node, and wherein nodes that are part of the video-on-demand topology receive at least some different media content from nodes that are part of the live broadcasting topology;
    selecting, by the first node, a live broadcasting service;
    registering, by a server, the first node as belonging to the live broadcasting topology portion of the network;
    receiving by the first node, a judgment result on whether to buffer a video data flow corresponding to the live broadcasting service;
    obtaining the video data flow corresponding to the live broadcasting service according to a selection result, and buffering the video data flow in a local disk of the first node, when the judgment result is a yes;
    streaming, from the first node, at least some of the buffered video data flow corresponding to the live broadcasting service to be buffered in another end user node that is part of the video-on-demand topology which receives different content from the different root node;
    receiving, from the first node, an indication of a drag event, the drag event indicating an earlier point in a video timeline corresponding to the live broadcasting service from where the buffered video data flow should be streamed;
    registering the first node as belonging to the video-on-demand topology portion of the network which receives different content from the different root node;
    determining a second node that contains the video data flow associated with the earlier point in the video timeline corresponding to the live broadcasting service; and
    providing, by the second node, the video data flow associated with the earlier point in the video timeline corresponding to the live broadcasting service to the first node, such that the another end user is enabled to streams or buffers the different media content from both the video-on-demand service which receives different content from the different root node and from the live broadcasting service corresponding to from the earlier point in the video time line to the same video timeline most currently buffered in the first node.

2. The P2P based method for playing media according to claim 1, before logging into the network, further comprising:
    performing, by a core server (CS), a uniform encoding process on a content source of the live broadcasting service or the video-on-demand service;
    sending the processed content source to a corresponding live broadcasting service edge server (Live_ES) or a corresponding video-on demand service edge server (VOD_ES); and
    selecting by a user the live broadcasting service through the Live_ES, and selecting the video-on-demand service through the VOD_ES.

3. The P2P based method for playing media according to claim 1, wherein the logging in the network comprises:
    logging into a user request routing system (RRS);
    judging whether buffer data exists in the local disks;
    obtaining video-on-demand service information corresponding to the buffer data from the RRS when the buffer data exists; and
    performing an information registration of the buffer data according to the video-on-demand service information.

4. The P2P based method for playing media according to claim 3, wherein the video-on-demand service information corresponding to the buffer data comprises:
    information of the VOD_ES and a super node (SN) corresponding to the buffer data;
    wherein the information registration of the buffer data is an information registration performed at the SN.

5. The P2P based method for playing media according to claim 2, wherein the selecting the live broadcasting service comprises:
    obtaining information of the Live_ES, information of the VOD_ES, and information of live broadcasting neighboring nodes corresponding to the live broadcasting service.

6. The P2P based method for playing media according to claim 5, wherein the obtaining the corresponding data flow according to the selection result, and buffering the video data flow when the judgment result is a yes comprises:
    obtaining an SN corresponding to the live broadcasting service through the VOD_ES;
    downloading the video data flow corresponding to the live broadcasting service from the Live_ES or the live broadcasting neighboring nodes; and
    performing a content registration of the live broadcasting service at the SN.

7. The P2P based method for playing media according to claim 1, wherein the selecting the video-on-demand service and receiving the judgment result on whether to buffer the video data flow corresponding to the video-on-demand service comprises:
    obtaining information of a VOD_ES corresponding to the video-on-demand service, information of a play node neighboring a play point of the video-on-demand service, and information on whether to buffer the video data flow corresponding to the video-on-demand service.

8. The P2P based method for playing media according to claim 7, wherein the obtaining the corresponding video data flow according to the selection result, and buffering the video data flow when the judgment result is a yes comprises:
    obtaining an SN and the video data flow corresponding to the video-on-demand service through the VOD_ES;
    requesting a connectable node set from the SN;
    downloading the video data flow corresponding to the video-on-demand service from the VOD_ES or nodes in the connectable node set; and performing a content registration of the video-on-demand service at the SN.

9. The P2P based method for playing media according to claim 1, wherein the judging whether to buffer the video data flow corresponding to the live broadcasting service or the video-on-demand service comprises:
   judging whether the number of buffer nodes of content of the video data flow corresponding to the live broadcasting service or the video-on-demand service is smaller than a set file level threshold, and if yes, buffering the video data flow corresponding to the live broadcasting service or the video-on-demand service.

10. The P2P based method for playing media according to claim 9, further comprising:
    judging whether the number of buffer nodes of content blocks of the video data flow corresponding to the live broadcasting service or the video-on-demand service is smaller than a set content block level threshold, and if yes, buffering the video data flow corresponding to the live broadcasting service or the video-on-demand service.

11. The P2P based method for playing media according to claim 1, further comprising:
    dragging a play point when the live broadcasting service is selected; registering at an RRS after dragging the play point, and exiting the live broadcasting mode;
    obtaining information of the video-on-demand node from the RRS;
    obtaining an SN corresponding to the video-on-demand service through a VOD_ES for performing the video-on-demand service;
    requesting a connectable node set from the SN;
    downloading the video data flow corresponding to the video-on-demand service from the VOD_ES or nodes in the connectable node set; and
    performing a content registration of the video-on-demand service at the SN.

12. The P2P based method for playing media according to claim 11, further comprising:
    obtaining from the RRS the judgment result on whether to buffer the video data flow corresponding to the video-on-demand service;
    requesting the connectable node set from the SN, if the judgment result is yes; downloading the video data flow corresponding to the video-on-demand service from the VOD_ES or the nodes in the node set; and
    performing the content registration of the video-on-demand service at the SN.

13. A node, comprising:
    one or more computing hardware which executes program instructions stored in a non-transitory computer-readable storage medium, which cause the node to:
      log into a network, wherein the network includes a plurality of interconnected nodes each arranged in one of a live broadcasting topology portion and a video-on-demand topology portion of the network, the live broadcasting topology portion is different and separate from the video-on-demand topology portion without sharing a common root node, wherein the live broadcasting topology portion and the video-on-demand topology portion each provide different media content originated from different root nodes;
      select a live broadcasting service or a video-on-demand service, wherein the node is registered with a network topology portion associated with the selection;
      receive network information required by the selected service and a judgment result on whether to buffer in a local disk of the node, a video data flow corresponding to the live broadcasting service or the video-on-demand service which receives different content from the different root node; and
      obtain the data flow corresponding to the live broadcasting service according to a selection result, and buffer the video data flow when the judgment result is a yes, wherein the node is further caused to stream at least some of the buffered data to be buffered in another end user node that is part of the video-on-demand topology which receives different content from the different root node,
    wherein the node is further caused to:
      communicate an indication of a drag event, the drag event indicating an earlier point in a video timeline corresponding to the live broadcasting service from where the buffered video data flow should be streamed;
      in response to the drag event, the node is caused to join the video-on-demand topology portion of the network, determine a second node that contains the video data flow associated with the earlier point in the video timeline, and receive the video data flow associated with the earlier point in the video timeline corresponding to the live broadcasting service from the second node, such that the another end user node streams or buffers the different media content from both the video-on-demand service which receives different content from the different root node and from the live broadcasting service corresponding to from the earlier point in the video time line to the same video timeline most currently buffered in the first node.

14. The node according to claim 13, wherein the node is further caused to:
    judge whether buffer data locally exists; and
    obtain video-on-demand service information corresponding to the buffer data when the buffer judging submodule judges that the buffer data locally exists, and perform an information registration of the buffer data according to the video-on-demand service information.

15. The node according to claim 13, wherein the node is further cased to:
    obtain the video data flow according to the selection result; and
    buffer the video data flow when the judgment result obtained is a yes.

16. A user request routing system (RRS), comprising one or more computing hardware which executes program instructions stored in a non-transitory computer-readable storage medium, which cause the RRS to:
    manage information of a first node;
    manage a live broadcast topology structure that defines the interconnection between a plurality of nodes receiving live broadcast content, and a video-on-demand topology structure that defines the interconnection between a plurality of notes receiving video-on-demand content, the live broadcasting topology portion is different and separate from the video-on-demand topology portion without sharing a common root node, wherein:
    at least some of the nodes that are part of the live broadcasting topology and at least some of the nodes that are part of the video-on-demand topology correspond to end user nodes and the live broadcasting topology structure and
    the video-on-demand topology structure each provide different content originated from different root node, the first node corresponds to an end user node, and nodes that are part of the video-on-demand topology receive at least some different media content of the different root node from nodes that are part of the live broadcasting topology; and manage information of one or more live broadcast edge servers and one or more video-on-demand edge servers; wherein the RRS is further caused to:
judge whether the number of buffer nodes of content of a video data flow corresponding to a live broadcasting service or a video-on-demand service is smaller than a set file level threshold.

17. A super node (SN), comprising one or more computing hardware which executes program instructions stored in a non-transitory computer-readable storage medium, which cause the super node to:

record state information of each node in a domain; and
judge whether the number of buffer nodes of content blocks of a video data flow corresponding to one of a live broadcasting service and a video-on-demand service is smaller than a set content block level threshold, according to the state information of each node in the domain, wherein;

at least some of the nodes that are part of the live broadcasting topology and at least some of the nodes that are part of the video-on-demand topology correspond to end user nodes and the live broadcasting service and the video-on-demand service each provides different contents originated from different root node;

the live broadcasting topology portion is different and separate from the video-on-demand topology portion without sharing a common root node;

the first node corresponds to an end user node, and nodes that are part of the video-on-demand topology receive at least some different media content of the different root node from nodes that are part of the live broadcasting topology.

18. A peer-to-peer (P2P) based system for playing media, comprising:

a core server (CS);
a live broadcasting service edge server (Live_ES);
a video-on-demand service edge server (VOD_ES), wherein the Live_ES and the VOD_ES each provides different contents originated from different root nodes, the live broadcasting service edge server is different and separate from the video-on-demand service edge server without sharing a common root node, a user request routing system (RRS), a super node (SN), and an end user node, wherein: the CS, Live_ES, VOD_ES, RRS, SN and end user node, each comprises respective one or more computing hardware which executes respective program instructions stored in respective non-transitory computer-readable storage medium, to cause the corresponding CS, Live_ES, VOD_ES, RRS, SN and end user node to perform respective functions; wherein:

the respective one or more hardware in the CS executes respective program codes to cause the CS to perform an encoding process on different media content originated from respective different content root nodes, and send the processed different media content to the corresponding Live_ES or VOD_ES;

the respective one or more hardware in the Live_ES executes respective program codes to cause the Live_ES to obtain a video data flow corresponding to a live broadcasting service from the CS, and provide the live broadcasting service video data flow to the end user node;

the respective one or more hardware in the VOD_ES executes respective program codes to cause the VOD_ES to obtain a video data flow corresponding to a video-on-demand service from the CS, and provide the video-on-demand service video data flow for the end user node;

the respective one or more hardware in the RRS executes respective program codes to cause the RRS to manage the Live_ES, the VOD_ES, and the end user node in a network;

the respective one or more hardware in the SN executes respective program codes to c cause the SN to manage each node and the different media content in a domain; and the respective one or more hardware in the end user node executes respective program codes to cause the end user node to receive, transmit, and buffer in a local disk, the video data flow corresponding to the live broadcasting service or the video-on-demand service which receives different content from the different content root node, wherein when the end user node is receiving a video data flow corresponding to the live broadcasting service, and when an amount of data buffered by the end user node reaches a threshold, the end user node is further caused to stream the buffered video data to a different end user node, such that the different end user node streams or buffers the different media content from both the video-on-demand service of the different content root node and from the live broadcasting service corresponding to from the earlier point in the video time line to a same video timeline most currently buffered in the first node.

* * * * *